United States Patent [19]

Huttenlocher

[11] Patent Number: 5,513,277
[45] Date of Patent: Apr. 30, 1996

[54] MEASURING CHARACTER AND STROKE SIZES AND SPACINGS FOR AN IMAGE

[75] Inventor: Daniel P. Huttenlocher, Ithaca, N.Y.

[73] Assignee: Xerox Corporation, Stamford, Conn.

[21] Appl. No.: 77,702

[22] Filed: Jun. 14, 1993

Related U.S. Application Data

[63] Continuation of Ser. No. 737,955, Jul. 30, 1991, abandoned.
[51] Int. Cl.⁶ ................................................. G06K 9/34
[52] U.S. Cl. .................... 382/171; 382/200; 382/289
[58] Field of Search .................... 382/9, 18, 22, 382/171, 200, 289

[56] References Cited

U.S. PATENT DOCUMENTS

| | | | |
|---|---|---|---|
| 2,838,602 | 6/1958 | Sprick | 178/15 |
| 2,983,822 | 5/1961 | Brouillette, Jr. | 250/202 |
| 3,297,989 | 1/1967 | Atchley et al. | 340/146.3 |
| 3,873,972 | 3/1975 | Levine | 340/146.3 |
| 4,288,779 | 9/1981 | Otsu et al. | 340/146.3 |
| 4,377,803 | 3/1983 | Lotspiech | 382/9 |
| 4,594,732 | 6/1986 | Tsuji | 382/9 |
| 4,610,025 | 9/1986 | Blum et al. | 382/9 |
| 4,723,297 | 2/1988 | Postl | 382/46 |
| 4,773,098 | 9/1988 | Scott | 382/21 |
| 4,773,099 | 9/1988 | Bokser | 382/14 |
| 4,802,230 | 1/1989 | Horowitz | 382/22 |
| 4,809,344 | 2/1989 | Peppers et al. | 382/32 |
| 4,847,912 | 7/1989 | Tanaka et al. | 382/9 |
| 4,887,301 | 12/1989 | Hodgens et al. | 392/9 |
| 5,001,766 | 3/1991 | Baird | 382/18 |
| 5,046,114 | 9/1991 | Zobel | 382/18 |
| 5,054,094 | 10/1991 | Barski | 382/18 |
| 5,111,514 | 5/1992 | Ohta | 382/9 |
| 5,216,725 | 6/1993 | McCubbrey | 382/9 |
| 5,245,674 | 9/1993 | Cass et al. | 382/15 |
| 5,253,307 | 10/1993 | Wayner et al. | 382/22 |

FOREIGN PATENT DOCUMENTS 0176910  4/1986  European Pat. Off. ......... G06K 9/32

OTHER PUBLICATIONS

European Search Report and Annex, Application No. EP 92 30 6948.
Tsuji, Y., and Asai, K., "Character Image Segmentation, Based Upon Minimum Variance Criterion," N.E.C. Research & Development, vol. 295, No. 78, Jul. 1985, pp. 23–30.
Sato et al., F6365 Japanese Document Reader, Fujitsu Sci. Tech. J., 26, 3, pp. 224–233 (Oct. 1990).
Akiyama, T., and Hagita, N., "Automated Entry System for Printed Documents," *Pattern Recognition*, vol. 23, No. 11, 1990, pp. 1141–1154.

*Primary Examiner*—Leo Boudreau
*Assistant Examiner*—Chris Kelley

[57] ABSTRACT

A processor measures size or spacing of connected components for an image of text by obtaining a distribution of measurements of distances between edges of connected components. The distances are measured along lines extending in a measuring direction, such as a direction parallel or perpendicular to lines of text, which can be determined based on a measurement of skew. The distance measurements then can be used to produce a distribution of measurements as a function of distance, such as a histogram. Sufficient distances are measured that the histogram or other distribution data indicates a measure of size or spacing of connected components for the image, such as a stroke width, a maximum character width or height, or a spacing between characters, words, or lines. To measure sizes, distance can be measured across pixels within connected components. To measure spacings, distance can be measured across pixels that are not within connected components. Measurements in a direction parallel to lines of text can indicate intercharacter spacing, interword spacing, vertical stroke width, and maximum character width. Measurements in a direction perpendicular to lines of text can indicate interline spacing, horizontal stroke width, and maximum character height. A machine could store an input image in memory, obtain data indicating size or spacing of connected components, modify the stored data according to the sizes or spacings indicated, and provide an output image based on the modification. The data indicating size or spacing could be used in segmentation and character recognition.

22 Claims, 17 Drawing Sheets

MEASURING CHARACTER AND STROKE SIZES AND SPACINGS FOR AN IMAGE

This is a continuation of application Ser. No. 07/737,955, filed Jul. 30, 1991 now abandoned.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

The present invention relates to analysis of an image that includes text.

Tanaka et al., U.S. Pat. No. 4,847,912, describe a technique of detecting a space between words with an optical character reader. As shown and described in relation to FIGS. 2–6, the reader scans each printed line in the direction of its height from its beginning to its end sequentially at a predetermined interval. The intervals are identified either as containing a printed part, represented by a black bit, or as being all white, represented by a white bit. The number of continuous white bits between black bits is counted. The histogram of the counts has two peaks corresponding to gaps between letters and gaps between words. The histogram is used to determine a threshold value for detecting a space between words, so that the beginning of each word can be identified.

Blum et al., U.S. Pat. No. 4,610,025, describe cryptographic analysis techniques. As shown and described in relation to FIGS. 3–7 and 9, a bit-mapped representation of an input page is broken into discrete glyph elements for further processing. As described in relation to FIG. 3, simple horizontal segmentation is performed, the shortest height glyph-line is selected, close line height analysis of selected lines is performed, whether any glyph line is a multiple of the height of the shortest glyph line is determined, overly high lines are selected, and vertical segmentation is performed. FIG. 4 illustrates simple horizontal segmentation, including recording the number of white or noise scan lines passed before encountering the first non-white/non-noise scan line or between glyph lines and also recording the number of lines separating. FIG. 4 also illustrates measuring the height of a glyph line in terms of the number of horizontal scan lines separating its uppermost and lowermost scan lines. FIG. 5 illustrates close line height analysis to determine whether a selected glyph line contains only a single line of text, based on horizontal distribution statistics from counts of black pixels occurring along scan lines. FIG. 6 illustrates vertical segmentation by analyzing the vertical white spacing located between glyphs in a line of text and by locating the larger white spaces to determine glyph words and blocks of glyph words. Vertical segmentation is performed by forming vertical scan lines and finding non-white/non-noise vertical scan lines to locate the leftmost and rightmost scan lines of each glyph and by counting the number of white or noise scan lines between glyphs. FIG. 7 illustrates operations that include determining the height and width of a glyph by counting pixels or scan lines and storing statistics descriptive of the glyph. As shown and described in relation to FIG. 2, the statistics about the glyphs can be used to obtain median width of glyphs on a page.

Tsuji, U.S. Pat. No. 4,594,732, describes letter pitch detection techniques. As shown and described in relation to FIGS. 1–2, the locations, heights, and widths of a series of letter blocks are detected and an effective one-letter width interval is determined on the basis of the frequency of occurrence (frequency distribution) of the widths of the series of letter blocks. The space widths are also used.

SUMMARY OF THE INVENTION

The present invention provides image processing techniques for analyzing an image that includes text. The techniques measure distances between edges of connected components along lines extending in a measuring direction, such as a direction parallel or perpendicular to lines of text. The measurement results are used to obtain distribution data indicating distribution of distances between edges of connected components in the measuring direction. Sufficient distances are measured that the distribution data further indicate a measure of size or spacing of connected components for the image, such as a stroke width, a maximum character width or height, or a spacing between characters, words, or lines.

One aspect of the invention is based on the discovery of techniques that measure character and stroke sizes and spacings for text in an image, but that avoid problems in measuring characters and strokes based on segmentation of an image into lines of text or into characters. Segmentation may be difficult if lines are closely spaced or if characters have bled together or are connected. An error in segmentation can lead to erroneous measurement, and making a measurement for a single line or for a single character can require inefficient computations, such as finding bounding boxes. Furthermore, segmentation can be done more effectively if character and stroke sizes and spacings are already known.

The techniques measure character and stroke sizes and spacings without segmenting the image. Instead, the techniques measure distances between edges of connected components along lines extending in one or more measuring directions and use the results to produce distribution data indicating a distribution of distances for each measuring direction. Each distance is measured either across a connected component or across a space between connected component edges. The distances can be measured, for example, in a direction approximately parallel to lines or text or in a direction approximately perpendicular to lines of text. If sufficient distances are measured, the distribution data indicate one or more measures of size or spacing of connected components in the measuring direction for the image. In other words, it is not necessary to measure all distances in the image—it is sufficient to measure a smaller number of distances in appropriate parts of the image so that the distribution of the measured distances is approximately the same as the distribution of distances for the image.

Such techniques can be implemented, for example, by obtaining distribution data indicating a distribution of measurements as a function of distance in each direction. The distribution data can take the form of a histogram. For example, in an image in which lines of text extend horizontally, four histograms can be obtained, one each for horizontal distances across spaces between connected component edges, for vertical distances across spaces between connected component edges, for horizontal distances across connected components, and for vertical distances across connected components. Data indicating character and stroke sizes and spacings can then be obtained from the histograms.

The histogram indicating horizontal distances between connected components ordinarily has two peaks, which can be found by smoothing, for example. The first, larger peak indicates intercharacter spacing and the second, smaller peak indicates interword spacing. The width of the first peak indicates the variation in intercharacter spacing, while the width of the second peak indicates the variation in interword spacing.

The histogram indicating vertical distances between connected components ordinarily has several peaks, which can be found by smoothing, For example. The peak at the largest distance indicates interline spacing. Peaks at smaller distances may indicate other frequent vertical spaces.

The histogram indicating horizontal distances across connected components ordinarily has one or more peaks for stroke width of vertical strokes, and may also be truncated at a value indicating maximum character width. If the vertical stroke width is constant, the histogram has a single peak for stroke width, but a typeface with variable stroke width may have two or more peaks for prominent stroke widths.

The histogram indicating vertical distances across connected components ordinarily has a peak for stroke width of horizontal strokes, and may also be truncated at a value indicating maximum character height. The histogram may also have a small peak or drop-off indicating height of lower case characters.

The distances can be measured, for example, by measuring distance from a starting pixel at the edge of a connected component to the nearest edges in the horizontal and vertical directions. If the connected component includes black pixels, distances between connected components can be measured across white pixels to the nearest black pixel and distances across connected components can be measured across black pixels to the nearest white pixel. Distances can be measured for sufficient starting pixels that the resulting distribution in each direction measures frequency of occurrence of each distance for the entire population of potential starting pixels. The starting pixels for which distances are measured can be selected by randomly or pseudorandomly generating a number indicating a candidate pixel, then determining whether the candidate pixel is at the edge of a connected component.

The measurement of distances in horizontal and vertical directions in an image of text produces results that depend directly on the skew of lines of characters in the text. Therefore, text line skew can be taken into account in producing distribution data that is independent of skew. For example, skew can be measured, and then the vertical and horizontal directions can be chosen based on the measured skew.

A machine implementing the invention can include image input means for receiving an input image and providing input image data and image output means for receiving output image data and providing an output image. A processor can store the input image data in memory, modify the stored image data in accordance with the character or stroke sizes or spacings indicated by distribution data, and then provide output image data to the output means based on the modified image data. For example, the output image data could include data indicating character or stroke sizes or spacings. Or the character or stroke sizes and spacings could be used in performing segmentation, text highlighting and selection, or document dry cleaning to remove marks that are not part of the text. These technique could be applied in a facsimile machine or other digital copier.

The techniques described above are rapid because distances can be measured at a relatively small number of pixels to obtain distribution data accurately indicating character and stroke sizes and spacings for an image. In addition, the techniques described above are more robust than similar measurements made by conventional character recognition systems because they eliminate the need to analyze connected components prior to making the measurements.

The following description, the drawings, and the claims further set forth these and other objects, features, and advantages of the invention.

DETAILED DESCRIPTION

A. Conceptual Framework

Figure 1:
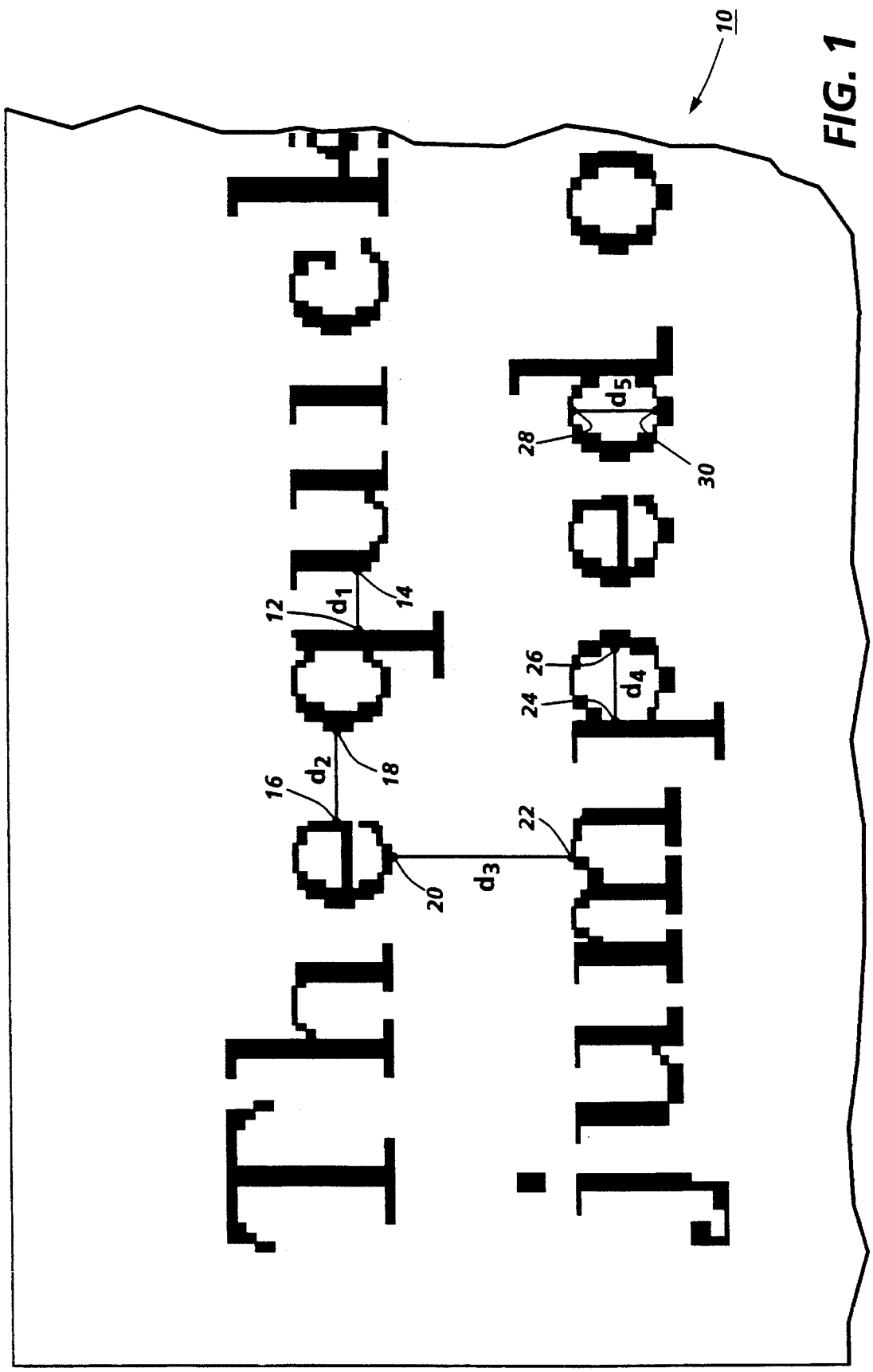
FIG. 1 is a schematic diagram showing measures of character and stroke spacing in an image that includes text.

The following conceptual framework is helpful in understanding the broad scope of the invention, and the terms defined below have the meanings indicated throughout this application, including the claims.

"Data" refers herein to signals that indicate information. When an item of data can indicate one of a number of possible alternatives, the item of data has one of a number of "values." For example, a binary item of data has one of two values, such as "0" and "1" or "ON" and "OFF."

"Data" includes data existing in any physical form, and includes data that is transitory or is being stored or transmitted. For example, data could exist as an electromagnetic or other transmitted signal or as a signal stored in electronic, magnetic, or other form.

A "data processing system" is a system that processes data. A "data processor" or "processor" is any component or system that can process data, and may include one or more central processing units or other processing components. A processor performs an operation or a function "automatically" when it performs the operation or function independent of concurrent human control. A "processing unit" is a processor that is a component within another processor.

Any two components are "connected" when there is a combination of circuitry that can transfer data from one of the components to the other. For example, two processing units are "connected" by any combination of connections between them that permits transfer of data from one of the processing units to the other.

"Memory" is any component, combination of components, or system that can store data, and may include local and remote memory and input/output devices.

A processor "accesses" data in memory by any operation that retrieves or modifies the data, such as by reading or writing a location in memory that includes the data. A processor can be "connected for accessing" data by any combination of connections with local or remote memory or input/output devices that permits the processor to access the data.

A processor "uses" data in performing an operation when the result of the operation depends on the value of the data.

Data "indicates" an attribute when the data has a value that depends on the existence of the attribute or on a measure of the attribute.

Data indicates a "distribution" of an attribute when it has a value that depends on a number of measurements of the attribute. For example, data can indicate a distribution of distances or of measurements of another scalar quantity by indicating frequency of each distance or by indicating the distances at which maxima of frequency occur.

A "histogram" is data that indicates a distribution of an attribute by indicating frequency of occurrence of the attribute's values. For example, if an attribute is measured over a range of magnitude, a histogram can indicate frequency as a function of magnitude. The range can be divided into parts and the histogram can indicate the number of measurements occurring in each part. Thus a histogram can be used to find maxima of frequency, for example.

To "obtain" or "produce" data is to perform any combination of operations that begins without the data and that results in the data. Data can be "obtained" or "produced" by any operations that result in the data. Data can be "obtained from" or "produced from" other data by operations that obtain or produce the data using the other data.

An item of data is produced by "combining" other items of data when logical or numerical operations are performed on the other items of data that yield an item of data of the same type. For example, numbers indicating distance can be combined by adding, by calculating the mean or average, by selecting one of the distances, by taking the square root of the sum of squares, or by another similar operation.

Data is produced "randomly or pseudorandomly" when it is produced by a technique that provides data indicating numbers that, over a sufficiently large group of numbers, are evenly distributed across a range. A "random number" is a number that is produced randomly or pseudorandomly. Unless the context requires otherwise, the word "random" includes both random and pseudorandom.

"Character" means a discrete element that appears in a written or printed form of a language. Characters in the English language can thus include not only alphabetic and numerical elements, but also punctuation marks, diacritical marks, mathematical and logical symbols, and other elements used in written or printed English. More generally, characters can include, in addition to alphanumeric elements, phonetic, ideographic, or pictographic elements.

A "stroke" is a mark that appears in a written or printed form of a language. Each character can be formed of one or more strokes, or a single stroke may form more than one character in a cursive script.

A "text" is an arrangement of one or more lines of characters; the characters of a text may form words. The "skew" or "skew direction" of lines of characters in a text or other lines in an image means the direction in which the lines extend.

An "array of data" or "data array" or "array" is a combination of items of data that can be mapped into an array. A "two-dimensional array" is a data array whose items of data can be mapped into an array having two dimensions.

Data "defines" an array when it includes data sufficient to obtain or produce the array. For example, data defining an array may include the defined array itself, a compressed or encoded form of the defined array, a pointer to the defined array, a pointer to a part of another array from which the defined array can be obtained, or pointers to a set of smaller arrays from which the defined array can be obtained.

An "image" is a pattern of light. An image may include characters, words, and text as well as other items such as graphics. A text may be included in a set of one or more images, such as in images of the pages of a document.

An image may be divided into "segments," each of which is itself an image. A segment of an image may be of any size up to and including the whole image.

Data "defines" an image when the data includes sufficient information to produce the image. For example, a two-dimensional array can define all or any part of an image, with each item of data in the array providing a value indicating the color of a respective location of the image.

Each location in an image may be called a "pixel." In an array defining an image in which each item of data provides a value, each value indicating the color of a location may be called a "pixel value". Each pixel value is a bit in the "binary form" of the image, a grey-scale value in a "grey-scale form" of the image, or a set of color space coordinates in a "color coordinate form" of the image, the binary form, grey-scale form, and color coordinate form each being a two-dimensional array defining the image.

Data is produced by "applying a criterion" to other data when the produced data indicates whether the other data meets the criterion. An operation that applies a criterion produces such data.

A criterion can be "applied" to a location in an image by applying the criterion to data defining the image in a manner that depends on the location. For example, if the image data includes a respective data item for each location, the criterion could depend on a value indicated by a location's data item or it could depend on the values indicated by the respective data items of a set of locations having a relationship to the location. A location "meets a criterion" if application of the criterion to the location produces data indicating that the location meets the criterion.

Pixels are "neighbors" or "neighboring" within an image when there are no other pixels between them and they meet an appropriate criterion for neighboring. If the pixels are rectangular and appear in rows and columns, each pixel may have 4 or 8 neighboring pixels, depending on the neighboring criterion used.

An "edge" occurs in an image when two neighboring pixels have sufficiently different pixel values according to an appropriate criterion for the occurrence of an edge between them. The term "edge pixel" may be applied to one or both of two neighboring pixels between which an edge occurs.

A set of pixels in an image is "connected" if each pixel has at least one neighboring pixel that is in the set and if each pair of pixels in the set are connected by a subset of other pixels in the set. A connected set of pixels bounded by an edge may be called a "connected component" or "blob," and these terms may also be applied to more than one connected sets of pixels that are grouped for image analysis. In an image of text, connected components "form" text when the edges of the connected components generally follow the outlines of the parts of the text; if a text includes strokes, characters, or lines of characters, for example, connected components forming the text would have edges that generally follow the outlines of the strokes, characters, or lines of characters.

An "image characteristic" or "characteristic" is a measurable attribute of an image. An operation can "measure" a characteristic by producing data indicating the characteristic using data defining an image.

A characteristic is measured "for an image" if the characteristic is measured in a manner that is likely to produce approximately the same result each time it occurs.

"Spacing" between connected components, when measured for an image, means one or more prominent values of the distribution of spacings between connected components in the image. "Spacing" between strokes, characters, words, or lines in an image of text similarly means one or more prominent values of the distribution of spacings between strokes, characters, words, or lines in the text. A prominent value could be a maximum of a histogram of spacings, for example.

"Size" of connected components, when measured for an image, means one or more prominent values of the distribution of sizes of connected components in the image. "Width" of strokes in an image of text similarly means one or more prominent values of the distribution of widths of strokes in the text. "Width" of characters in an image of text similarly means one or more prominent values of the distribution of widths of characters in the text, measured in a direction approximately parallel to lines of text. "Height" of characters in an image of text similarly means one or more prominent values of the distribution of heights of characters in the text, measured in a direction approximately perpendicular to lines of text. A prominent value of a size could be a value at which a maximum frequency occurs in a histogram of sizes, for example. A prominent value of a size could alternatively be a maximum size that occurs in an image, such as maximum character width or height.

A "version" of a first image is a second image produced using data defining the first image. The second image may be identical to the first image, or it may be modified by loss of resolution, by changing the data defining the first image, or by other processes that result in a modified version.

An "image input device" is a device that can receive an image and provide a signal defining a version of the image. A "scanner" is an image input device that receives an image by a scanning operation, such as by scanning a document.

An "image output device" is a device that can receive a signal defining an image and provide the image as output. A "display" is an image output device that provides the output image in human viewable form.

B. General Features

Figure 2:
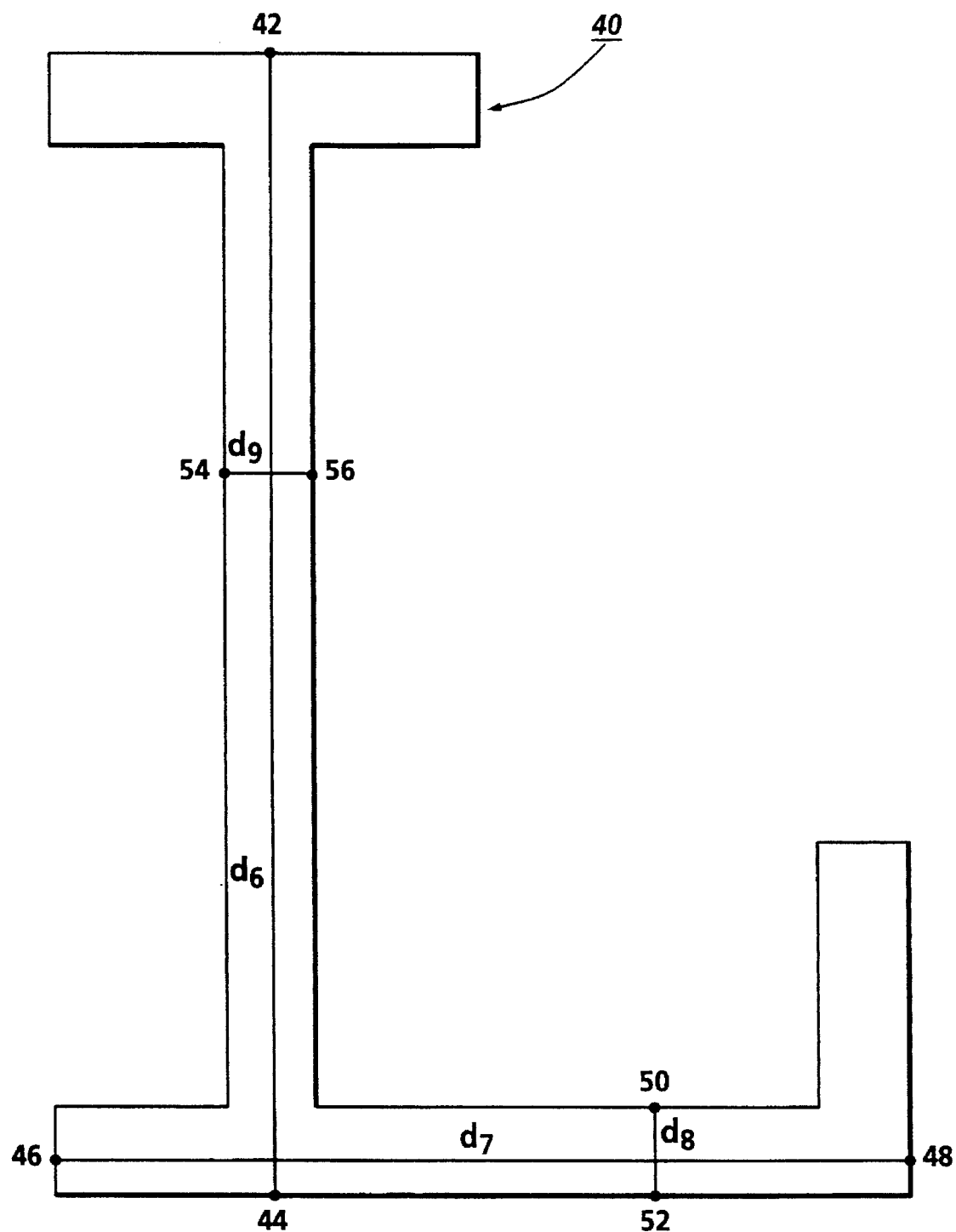
FIG. 2 is a schematic diagram showing measures of character and stroke size in a connected component in an image.
Figure 3:
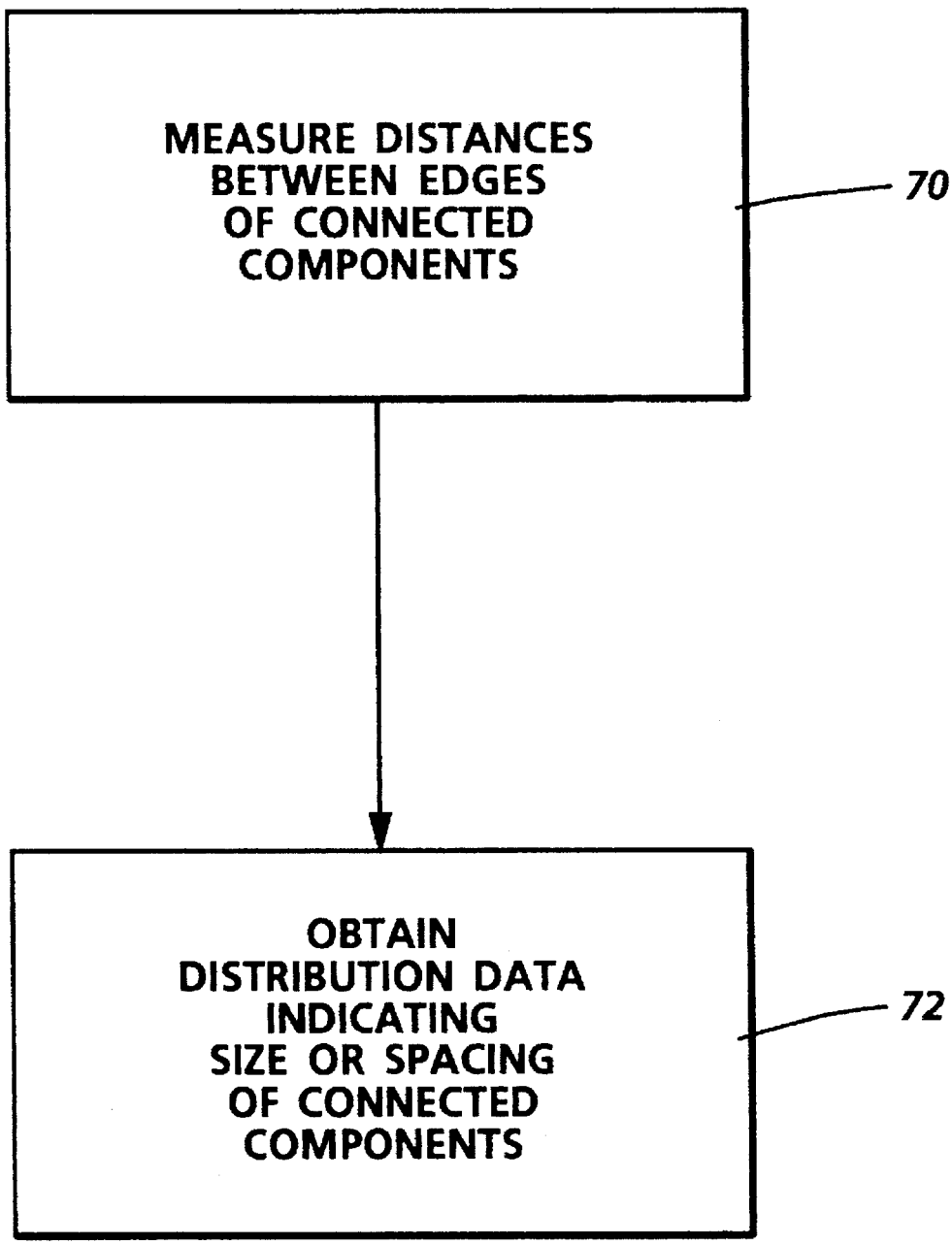
FIG. 3 is a flow chart showing general steps in a technique that obtains distribution data indicating character or stroke size or spacing.

FIGS. 1–3 illustrate general features of the invention. FIG. 1 shows an image with distance measurements between connected components to obtain data indicating spacing between characters and lines. FIG. 2 shows an image with measurements made across a connected component to obtain data indicating character size and stroke width. FIG. 3 is a flowchart showing general steps in obtaining data indicating size or spacing of connected components.

FIG. 1 shows image 10 which includes lines of text in which distance measurements can be made horizontally or vertically between connected components to measure spacing of connected components in the image. Each measurement starts from a starting location that meets an edge criterion and continues across a space between connected components to an ending location that also meets the edge criterion.

From starting location 12, a first distance $d_1$ is measured along a line parallel to the text lines to location 14 where the line meets an edge. From starting location 16, a second distance $d_2$ is measured parallel to the text lines to location 18 where the line meets an edge. From starting location 20, a third distance $d_3$ is measured along a line perpendicular to the text lines to location 22 where the line meets an edge. From starting location 24, a fourth distance $d_4$ is measured parallel to the text lines to location 26 where the line meets an edge. From starting location 28, a fifth distance $d_5$ is measured perpendicular to the text lines to location 30 where the line meets an edge. The distance $d_1$ indicates an intercharacter spacing, $d_2$ an interword spacing, and $d_3$ an interline spacing. Distances $d_4$ and $d_5$ indicate parallel and perpendicular inner-character spacings, respectively.

FIG. 2 shows connected component 40 across which distance measurements can be made horizontally or vertically to measure character size. Each measurement starts from a starting location that meets an edge criterion and continues across connected component 40 to an ending location that also meets the edge criterion. The horizontal and vertical directions can be parallel and perpendicular to the text lines that include connected component 40.

From starting location 42, a distance $d_6$ is measured along a line vertically to location 44 where the line meets an edge. From starting location 46, a distance $d_7$ is measured horizontally to location 48 where the line meets an edge. From starting location 50, a distance $d_8$ is measured vertically to location 52 where the line meets an edge. From starting location 54, a distance $d_9$ is measured horizontally to location 56 where the line meets an edge. Distance $d_6$ is a component height. Distance $d_7$ is a component width. Distance $d_8$ is the width of a horizontal stroke, and distance $d_9$ is the width of a vertical stroke.

In the flowchart of FIG. 3 the step in box 70 measures distances in a direction between edges of connected components in an image of text. The step in box 72 uses the distances to obtain distribution data indicating the distribution of distances in a direction. The measured distances are sufficient that the distribution data also indicate size or spacing of connected components for the image. This could be done by measuring distances at all edge locations in the image, but it can be done more efficiently by selecting a smaller number of edge locations as starting locations for distance measurement, as described more fully below. The starting locations are selected so that the distance measurements are representative of the distances between edge locations for the image.

Figure 4:
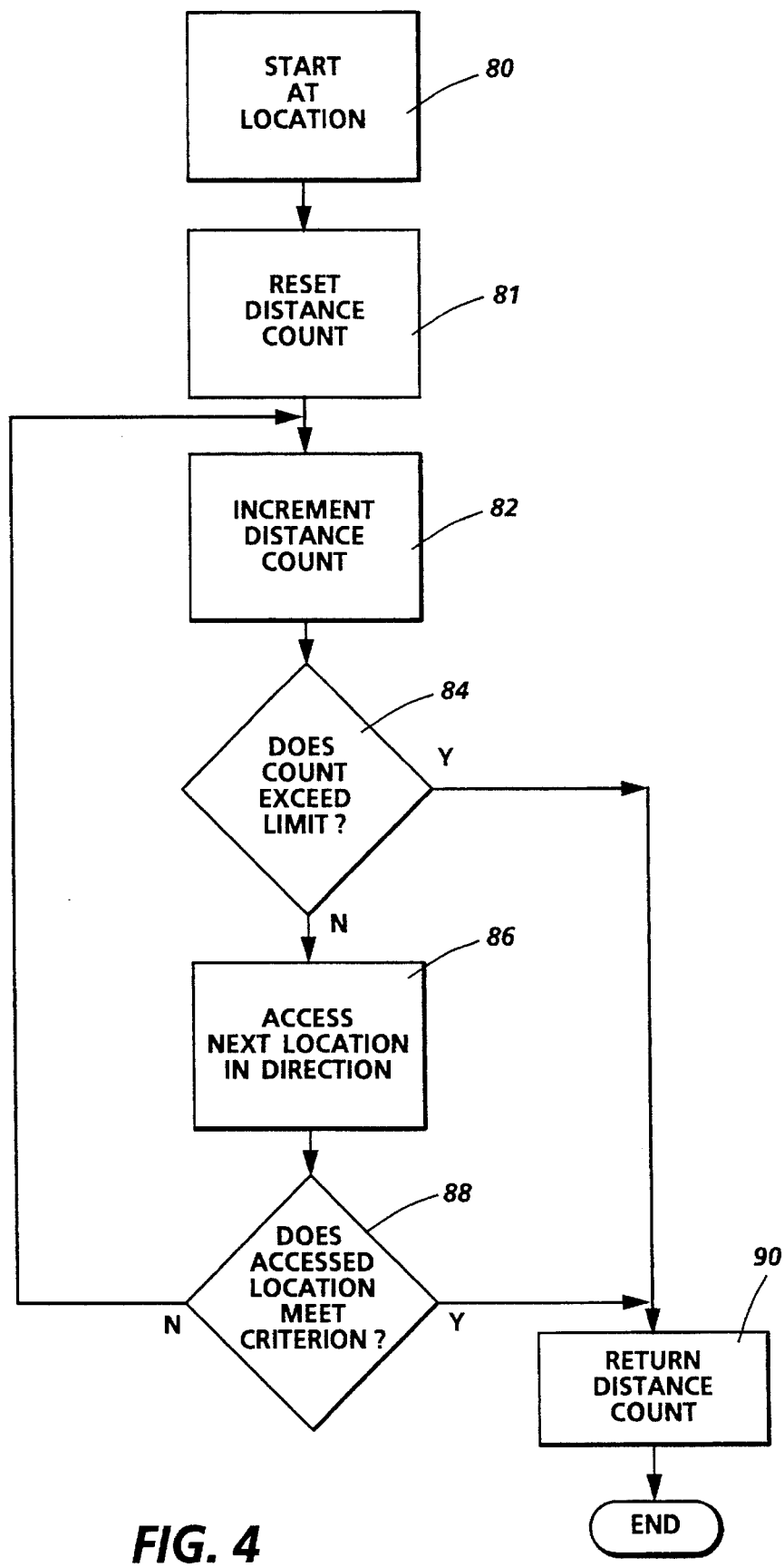
FIG. 4 is a flow chart showing steps in obtaining a distance count indicating distance from a starting pixel to a pixel that meets a criterion.
Figure 5:
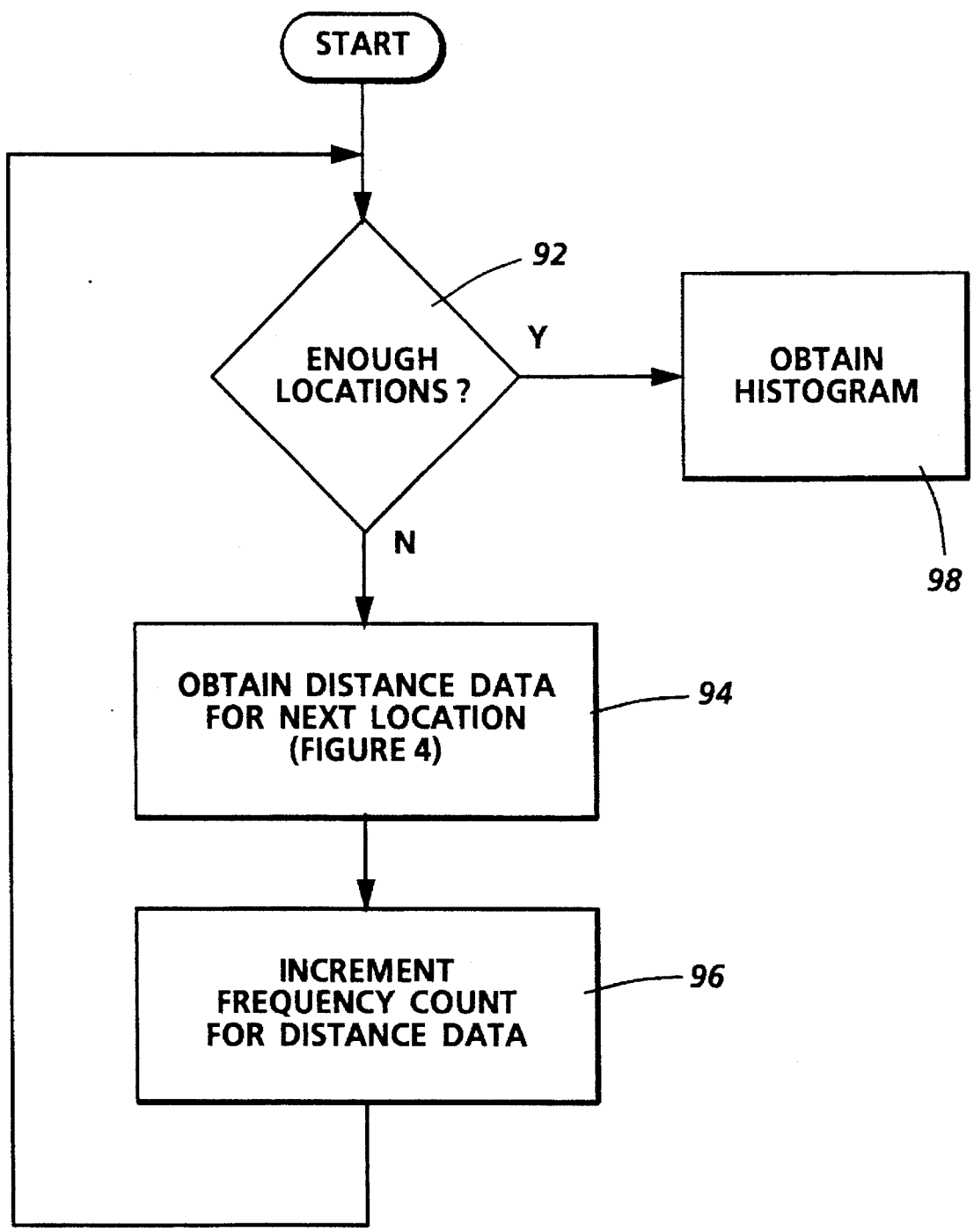
FIG. 5 is a flow chart showing steps in obtaining a histogram of distances measured as in FIG. 4.

The flowcharts of FIGS. 4 and 5 show a method that can be used to obtain a histogram of distance data. The flowchart of FIG. 4 shows steps in measuring distance from a starting location to an ending location. The flowchart of FIG. 5 shows steps in storing the distance data from FIG. 4 in a histogram data structure.

FIG. 4 shows steps in obtaining data indicating the distance along a line in a direction from a location to the nearest location along the line meeting a criterion, such as an edge criterion. The step in box 80 starts at a location. The step in box 81 resets a distance count to start counting distance. The step in box 82 increments the distance count. The test in box 84 determines whether the distance count exceeds a limit. The distance limit could be based on the height and width of the image, or on an arbitrary length after which no important data is likely to be found. If the distance limit is not exceeded, the step in box 86 accesses data defining the next location along the line. The step in box 88 then tests the accessed location to see if it meets the criterion.

If the accessed location does not meet the criterion, another iteration begins with the step in box 82. Iterations continue until a location is found that meets the criterion in box 88, or the distance count exceeds the distance limit in box 84. For example, if the criterion is an edge pixel, the step of box 88 would test whether the next location is an edge pixel, and iterations would continue until an edge pixel is found or the distance limit is exceeded. At that point, the step in box 90 returns the distance count, which indicates either the distance to the nearest edge pixel or the distance limit.

The step in box 88 can find an edge pixel based on a simple criterion. For example, if the starting location is a black edge pixel, the next nonadjacent black pixel is an edge pixel when measuring distance between connected components, and the next nonadjacent white pixel is an edge pixel when measuring distance across a connected component.

FIG. 5 shows general steps in combining distance data for a plurality of selected locations in an image to obtain a histogram of distances for the image that includes the locations. Factors useful in determining an appropriate number of locations and techniques for selecting locations are described in copending, coassigned U.S. patent application Ser. No. 07/737,956, entitled "Image Analysis Based on Location Sampling" ("the location sampling application"), incorporated herein by reference.

The step in box 92 begins an iterative loop that handles each of a number of locations. Data indicating a distance are obtained for the next location by the step in box 94, such as by finding a location that meets the starting criterion, and then following the steps in FIG. 4 to obtain a distance count from the location. Then the step in box 96 increments a frequency count for a range that includes the distance indicated by the distance data. The frequency count can be stored with frequency counts for other ranges in a data structure in memory, so that each frequency count in the data structure indicates how many locations have been found with a distance in the respective range. When distances at sufficient locations have been measured, the step in box 98 obtains a histogram using the frequency counts. The histogram may then be used or stored.

Each iteration of the loop in FIG. 5 measures a distance in the same direction, so that the resulting histogram indicates distribution of distances in that direction for the image. The direction can be chosen so that the histogram indicates size or spacing of connected components in the image. Depending on the attribute to be measured, distance may be measured in different directions, such as parallel to lines of text in the image for character width or interword spacing, or perpendicular to lines of text for character height or interline spacing.

The flowcharts of FIGS. 6–9 show steps in using a histogram to obtain data indicating character or stroke sizes or spacings for text in an image.

Figure 6:
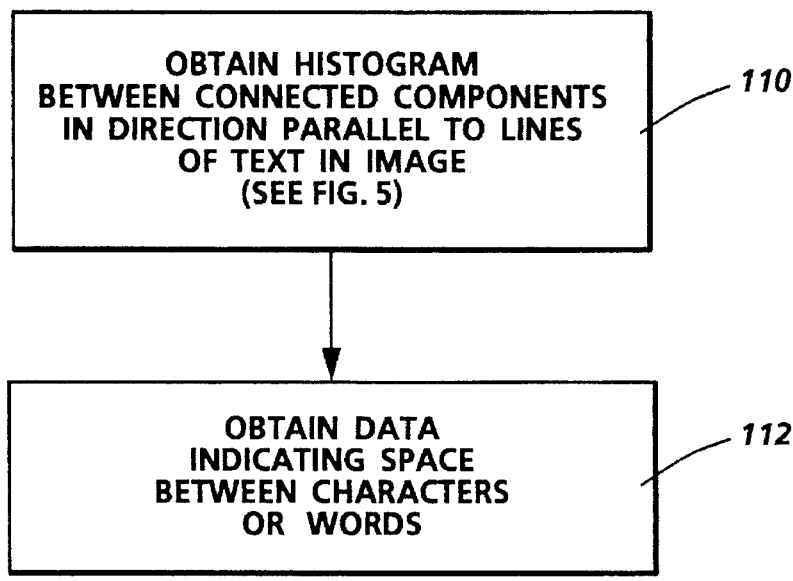
FIG. 6 is a flow chart showing steps in using a histogram produced as in FIG. 5 to obtain data indicating horizontal spacing.

The step in box 110 of FIG. 6 obtains a histogram of distances between connected components in a direction parallel to lines of text in an image, following the steps of FIG. 5. For black text on a white background, this step measures distance across white pixels between edge pixels. The step in box 112 uses the histogram to obtain data indicating spacings between characters or words for the image.

Figure 7:
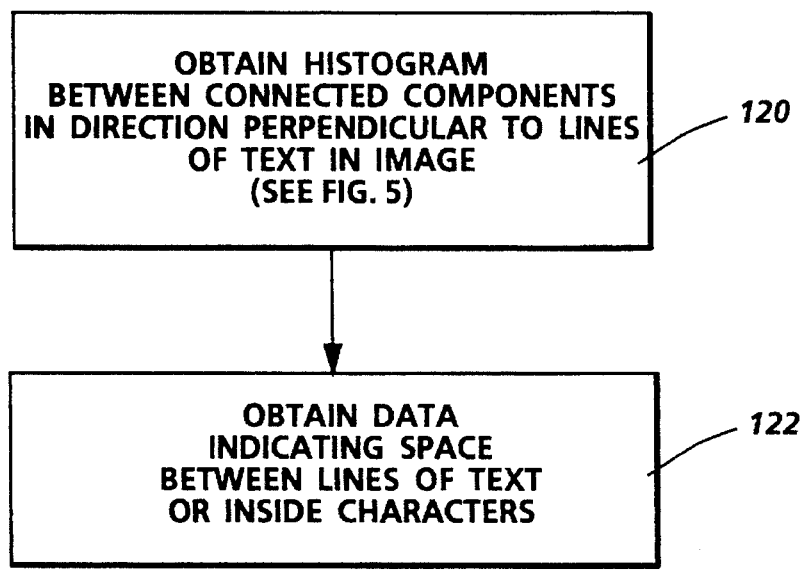
FIG. 7 is a flow chart showing steps in using a histogram produced as in FIG. 5 to obtain data indicating vertical spacing.

The step in box 120 of FIG. 7 obtains a histogram of distances between connected components in a direction perpendicular to lines of text in an image, following the steps of FIG. 5. For black text on a white background, this step measures distance across white pixels between edge pixels. The step in box 122 uses the histogram to obtain data indicating spacings between text lines or vertically inside characters.

Figure 8:
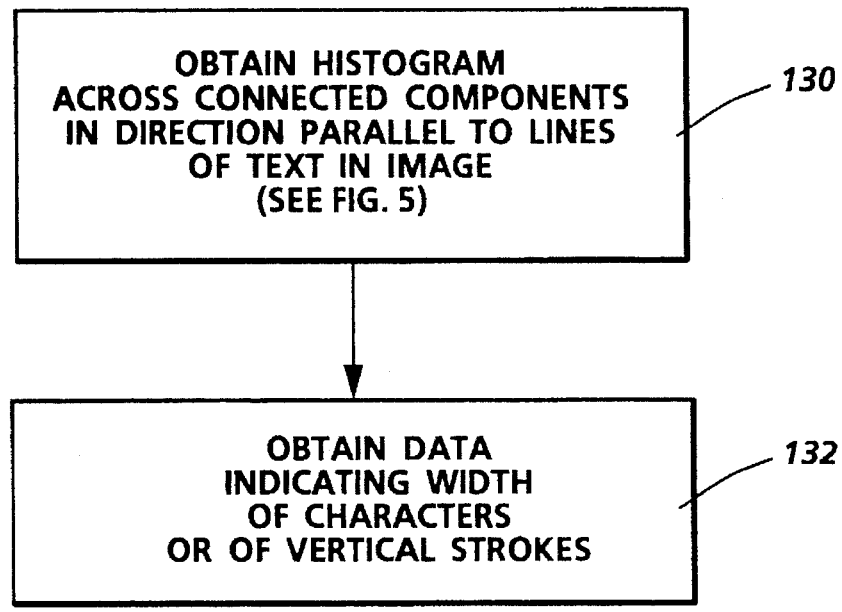
FIG. 8 is a flow chart showing steps in using a histogram produced as in FIG. 5 to obtain data indicating horizontal size.

The step in box 130 of FIG. 8 obtains a histogram of distances across connected components in a direction parallel to lines of text in an image, following the steps of FIG. 5. For black text on a white background, this step measures distance across black pixels between edge pixels. The step in box 132 uses the histogram to obtain data indicating width of characters or width of vertical strokes in the text.

Figure 9:
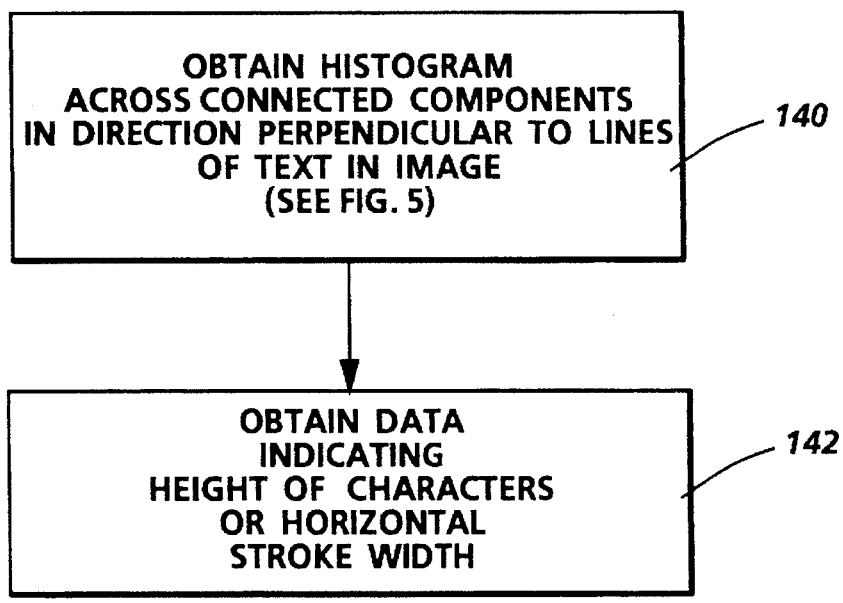
FIG. 9 is a flow chart showing steps in using a histogram produced as in FIG. 5 to obtain data indicating vertical size.

The step in box 140 of FIG. 9 obtains a histogram of distances across connected components in a direction perpendicular to lines of text in an image, following the steps of FIG. 5. For black text on a white background, this step measures distance across black pixels between edge pixels. The step in box 142 uses the histogram to obtain data indicating height of characters or width of horizontal strokes in the text.

FIGS. 10–13 show histograms obtained in the manner described in FIGS. 6–9 for a text image of black text on a white background.

Figure 10A:
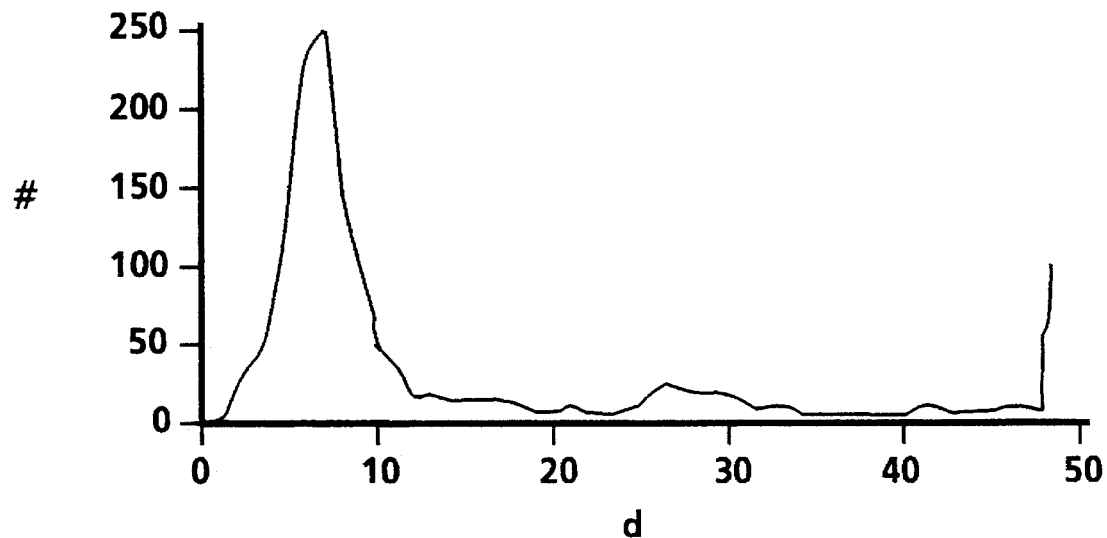
FIG. 10A is a histogram produced as in FIG. 6.

FIG. 10A shows a histogram of distances between connected components in the direction parallel to the lines of text in an image of New York typeface, obtained following the steps shown in FIG. 6. The horizontal axis is the length of the white runs, and the vertical axis is the number of edge pixels having white runs of a given length. The most common white run lengths occur at the intercharacter spacing interval and at the interword spacing interval.

Figure 10B:
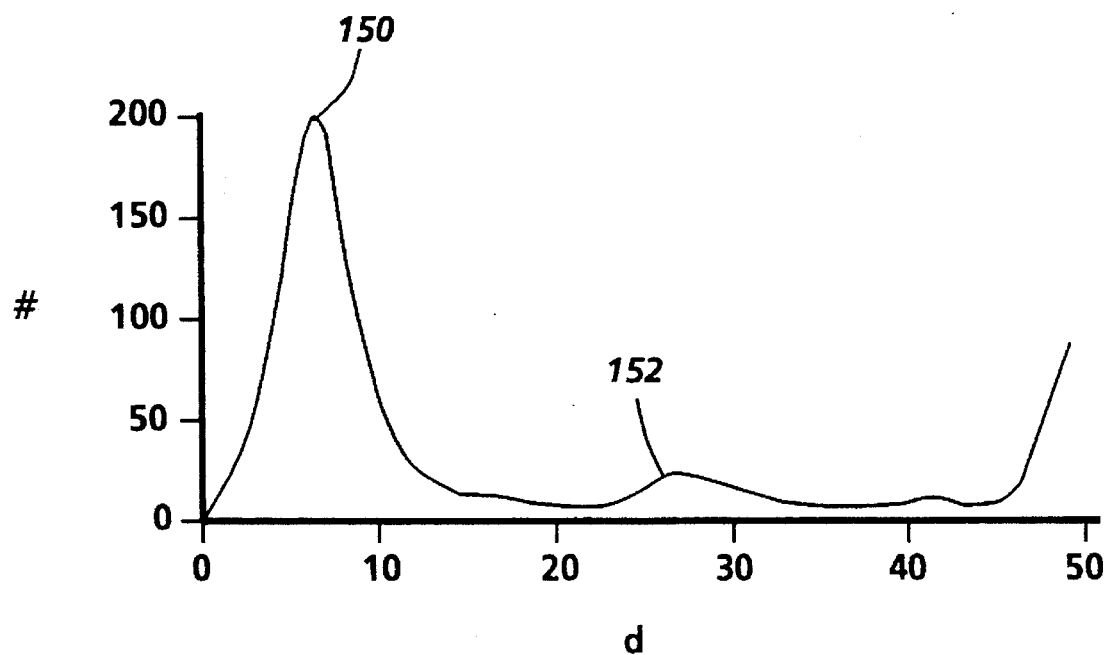
FIG. 10B is a smoothed version of the histogram in FIG. 10A.

FIG. 10B shows the histogram of FIG. 10A after smoothing, where the peaks are more distinct. The step of smoothing the function also smooths out false peaks caused by spaces inside characters or noise in the image, for example. In FIG. 10B, the intercharacter spacing interval of about 7 pixels is shown by the first large peak 150, and the interword spacing interval is given by smaller peak 152 at about 25 pixels. The width of each peak may be dependent on the typeface—for typefaces where the intercharacter spacing varies considerably, the first peak is broader; where the intercharacter spacing is constant the peak is narrower. The same holds true for interword spacing.

Another peak is shown around 48 pixels. This peak indicates the distance limit, which will often be the result of measuring distance from edge pixels adjacent to the margins of white at each side of the image.

Figure 11A:
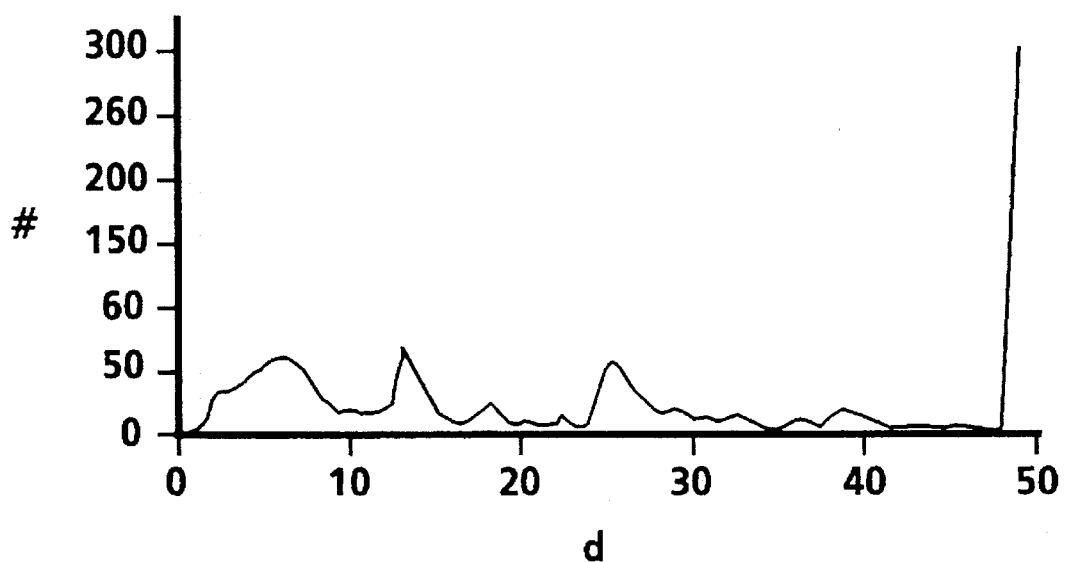
FIG. 11A is a histogram produced as in FIG. 7.
Figure 11B:
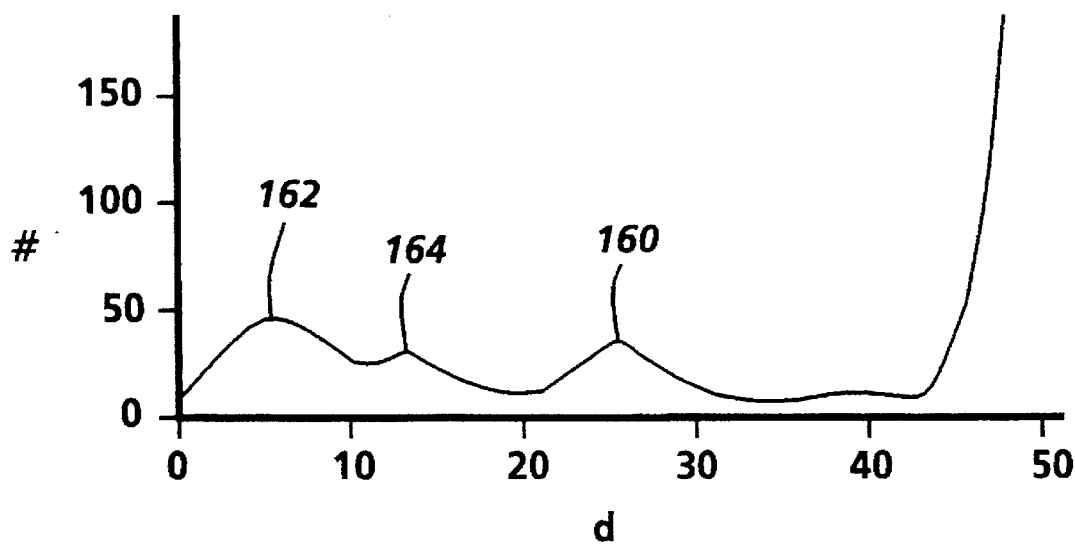
FIG. 11B is a smoothed version of the histogram in FIG. 11A.

FIG. 11A shows a histogram of distances between connected components in the direction perpendicular to the lines of text in an image of New York typeface, obtained following the steps shown in FIG. 7. The histogram captures a number of properties of the text, including the white spaces within characters, the spaces above and below ascending and descending characters, and interline spacing. FIG. 11B shows the smoothed histogram. Peak 160, the third peak, is the interline spacing at about 25 pixels. The first peak 162 at about 7 pixels indicates the white spaces within characters. The second peak 164 at about 13 pixels indicates the space above and below ascending and descending characters.

Once again, another peak is shown around 48 pixels. This peak indicates the distance limit, which will often be the result of measuring distance from edge pixels adjacent the margins of white at the top and bottom of the image.

Figure 12:
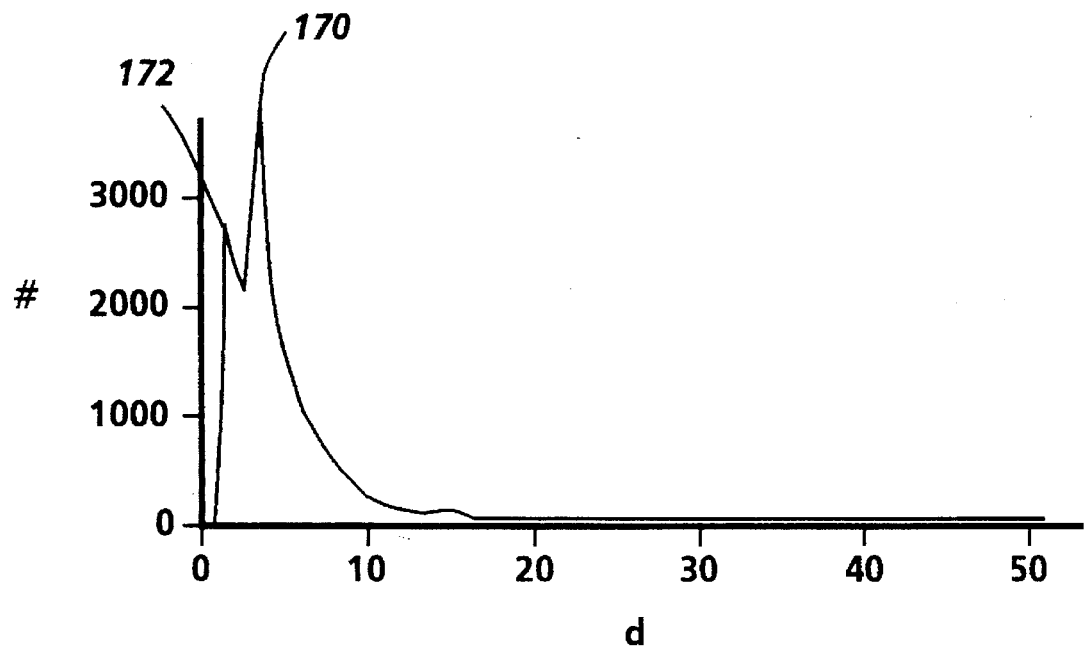
FIG. 12 is a histogram produced as in FIG. 8.

FIG. 12 shows a histogram of distances across connected components in the direction parallel to lines of text in an image of New York typeface, obtained following the steps shown in FIG. 8. The histogram captures stroke width of vertical strokes, and if the image contains only characters it also captures character width. Peak 170 shows the width of vertical strokes. Second peak 172 occurs because this typeface uses a variable stroke width. A typeface with a constant stroke width, such as Avant Garde, has only a single peak at the stroke width. The histogram drops off to zero at 16 pixels, indicating maximum width of the characters.

Figure 13:
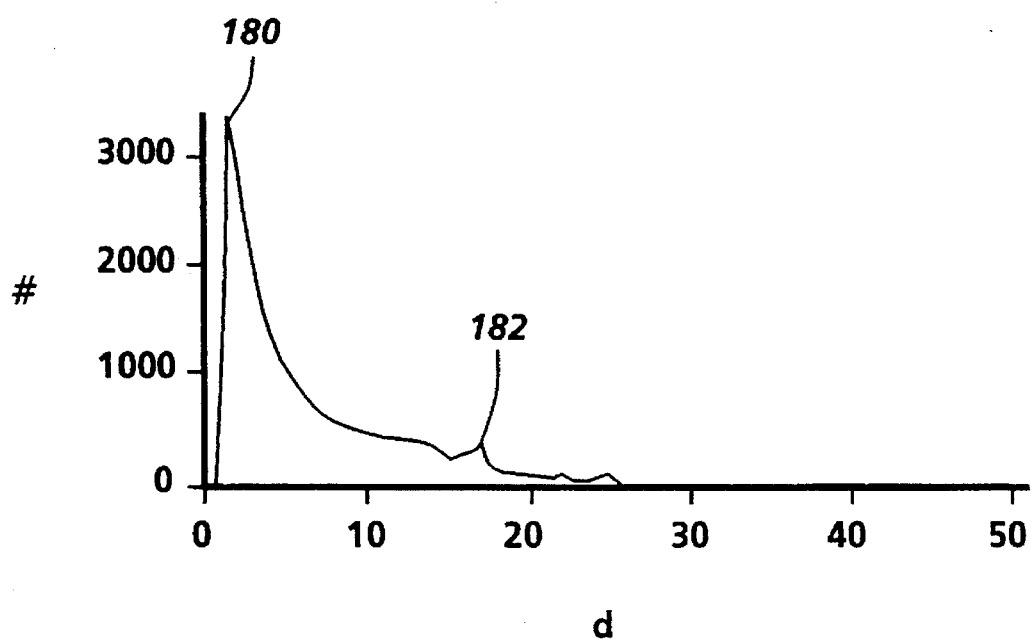
FIG. 13 is a histogram produced as in FIG. 9.

FIG. 13 shows a histogram of distances across connected components in the direction perpendicular to lines of text in an image of New York typeface, obtained as shown in FIG. 9. The histogram captures the width of horizontal strokes, and if the page contains only characters it also captures character height. Peak 180 at about 3 pixels indicates the width of horizontal strokes in the image. The histogram drops off to zero at about 25 pixels, indicating the maximum height of the characters. The drop at peak 182 to about 18 pixels indicates the height of lower case characters. This latter measure may be quite difficult to extract reliably from histograms.

Figure 14:
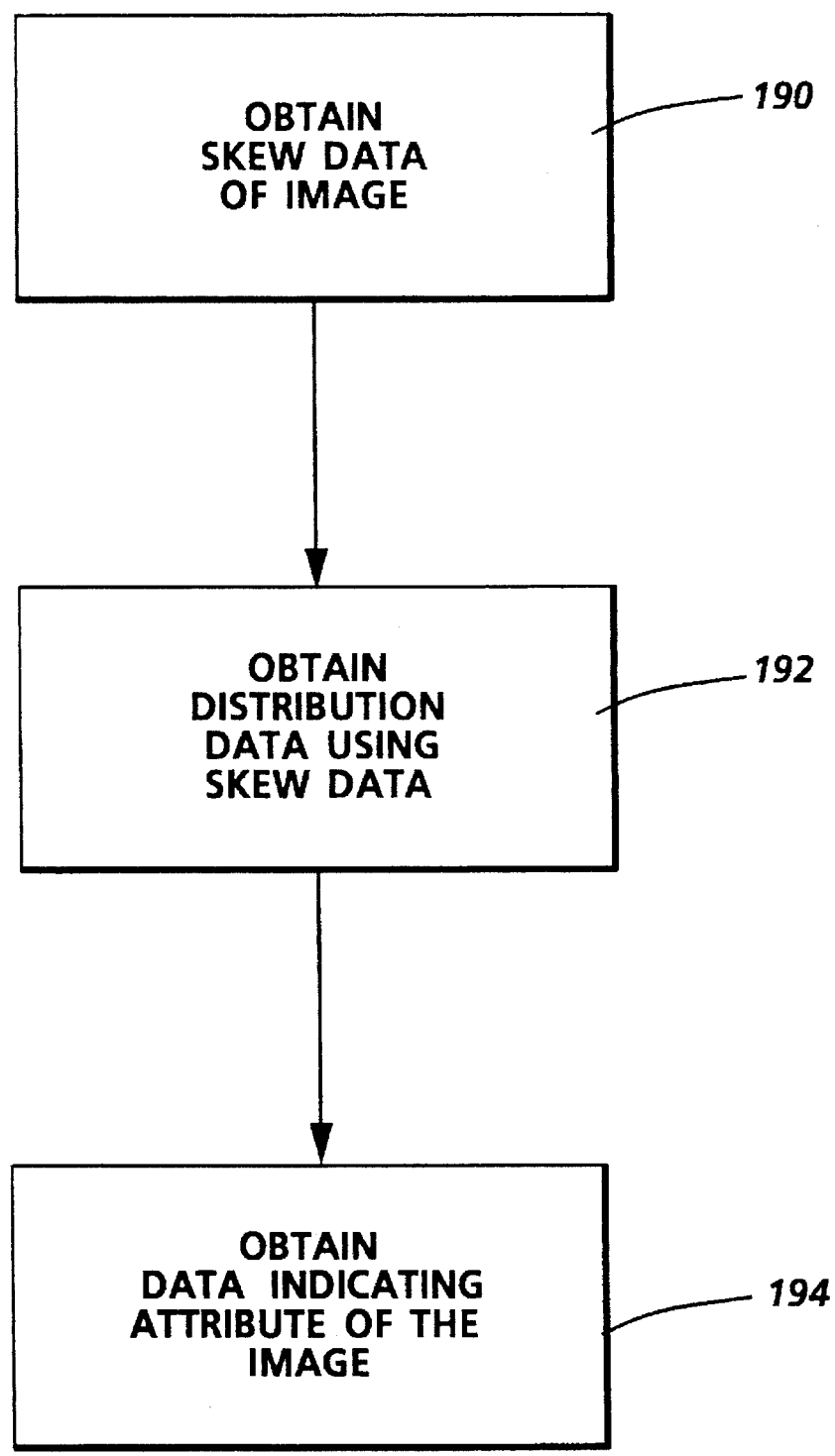
FIG. 14 is a flow chart showing steps that use skew data in producing data indicating an attribute, as in FIGS. 6–9.

The flowchart of FIG. 14 shows steps in obtaining size and spacing data for text in an image using information about skew. If skew of the image is not taken into consideration, histograms of the text may not indicate the correct measurements of character and stroke size and spacing.

The step in box 190 obtains skew data indicating the skew of text lines in an image. The measurement of skew may be obtained according to the techniques described in copending, coassigned U.S. patent application Ser. No. 07/737,863, now continued as application Ser. No. 08/043,135 entitled "Coarse and Fine Skew Measurement," incorporated herein by reference.

The step in box 192 uses the skew data in obtaining distribution data indicating size or spacing of connected components for the image. This may be done by first correcting the page orientation to deskew the image, or by shifting the angles at which distances are measured to compensate for the skew. The step in box 194 uses the distribution data to obtain data indicating a character or stroke size or spacing attribute, which could be obtained as in one of FIGS. 6–9, as illustrated by FIGS. 10–13.

C. Implementations

Figure 15:
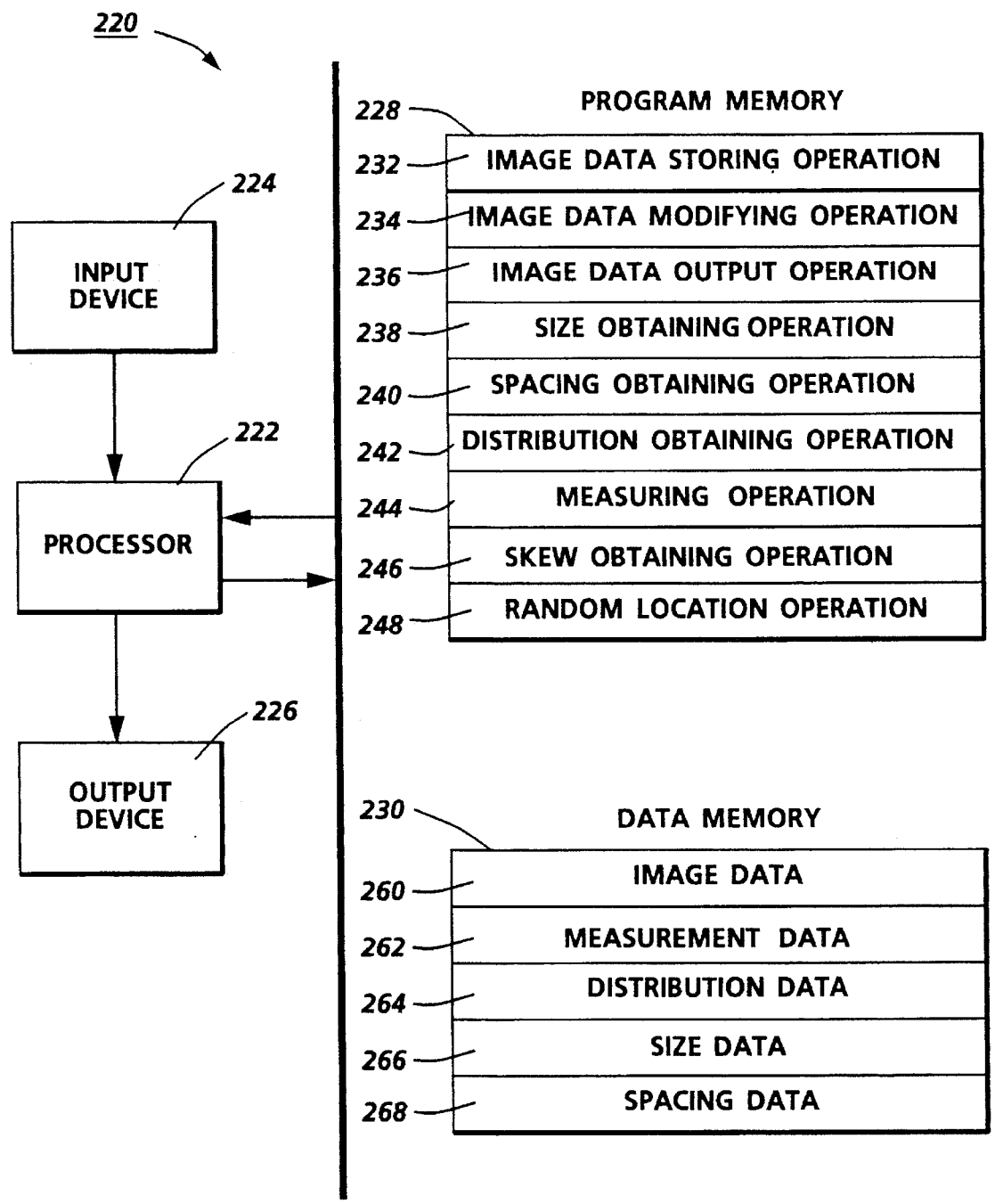
FIG. 15 is a schematic block diagram of a system in which the invention is implemented with a serial machine.

FIG. 15 shows system 220 in which the invention is implemented on a serial machine. Processor 222 is connected for receiving input data from input device 224 and for providing output data to output device 226. Processor 222 can be the CPU of a workstation, and input device 224 and output device 226 can be I/O devices. For example, input device 224 can be an image input device such as a scanner or a digital image source. Also input device 224 can provide a connection to a peripheral storage device or other storage or transmission medium from which model profiles that indicate distance as a function of direction can be received. Similarly, output device 226 can be a device for providing data obtained by processor 222, such as data indicating a typeface or a profile that indicates distance as a function of direction in an image, to a storage or transmission medium.

During operation, processor 222 executes instruction from program memory 228 and accesses data memory 230 to read and write data. Program memory 228 stores instructions for various operations of processor 222. Data memory 230 stores data structures as shown and can also temporarily store intermediate data used by the processor 222 in performing its operations.

Image data storing operation 232 receives image data through input device 224 and stores it in data memory 230, and image data modifying operation 234 modifies image data 260. Similarly, image data output operation 236 provides image data 260 to output device 226.

Size obtaining operation 238 obtains data indicating a size attribute of characters or strokes in an image, and can store the results in data memory 230 as size data 266. Spacing obtaining operation 240 obtains data indicating a spacing attribute of characters or strokes in an image, such as spacing between characters, words, or lines, and can store the results as spacing data 268. Size obtaining operation 238 and spacing obtaining operation 240 may call distribution obtaining operation 248 to obtain distribution data 264, and the results can be stored in distribution data 264 in data memory 230. Measuring operation 244 may be called by distribution obtaining operation 242 to measure distance in a direction in the image from a starting location, and the results can be stored in measurement data 262 in data memory 230.

Skew obtaining operation 246 may be called by size obtaining operation 238 and spacing obtaining operation 240 to obtain skew information about an image which may be used in obtaining size or spacing information. Random location operation 248 may be called by distribution obtaining operation 242 to obtain starting locations from which measuring operation 244 measures distance.

Image data 260 in data memory 230 includes data indicating a value for each pixel of an image. Image data 260 can be stored by image data storing operation 232. Measurement data 262 stores distances across and between connected components, and may be accessed to store the results of measuring operation 244 as described above.

Distribution data 264 may be accessed to store the results of distribution obtaining operation 242 as described above.

Size data 266 may be accessed by size obtaining operation 238, and spacing data 268 may be accessed by spacing obtaining operation 240.

Figure 16:
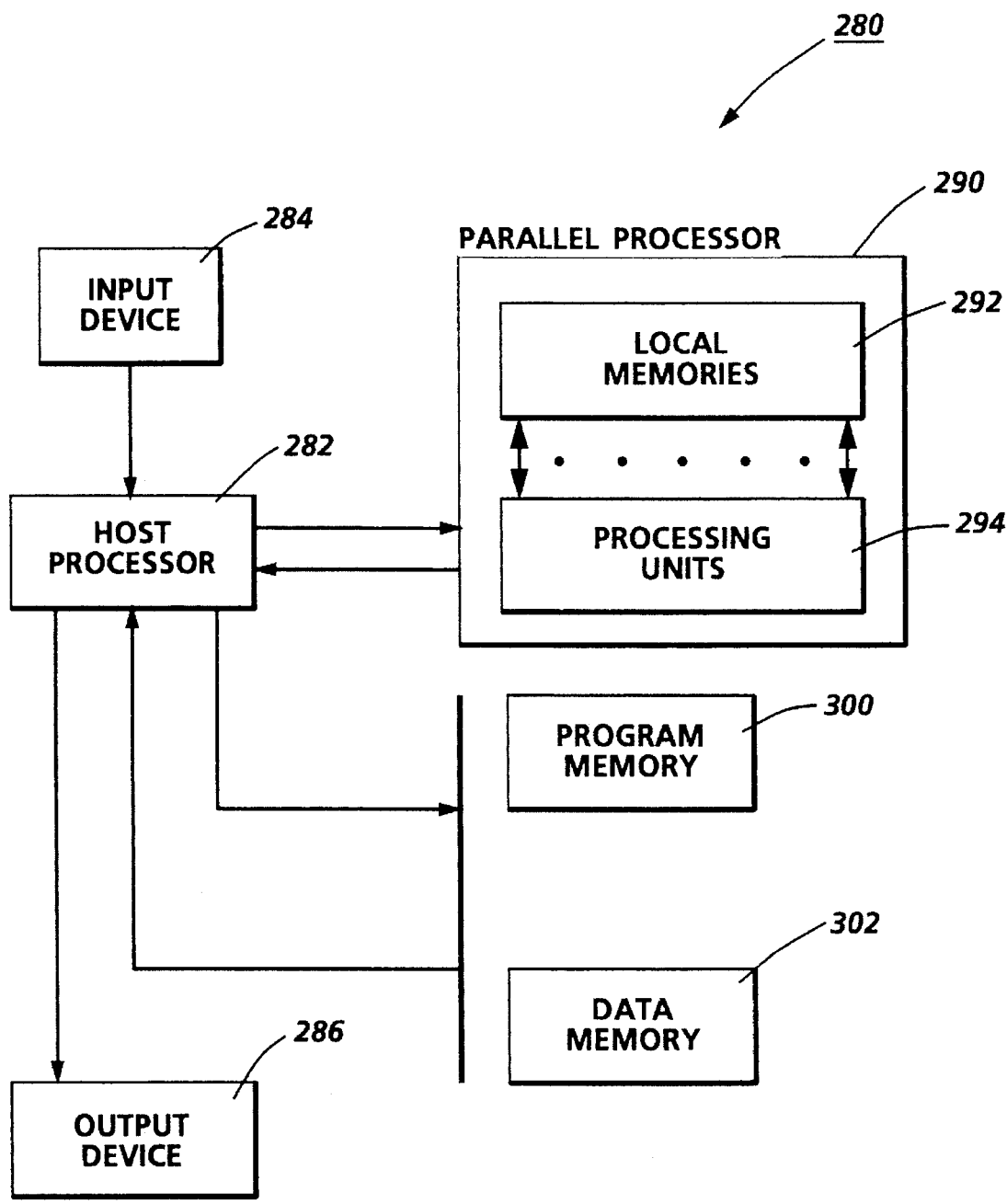
FIG. 16 is a schematic block diagram of a system in which the invention is implemented with a parallel machine.

System 280 in FIG. 16 is a parallel system which resembles system 220 in FIG. 15. System 280 includes host processor 282 connected to receive data from input device 284 and to provide data to output device 286. Host processor 282 is also connected to exchange data with parallel processor 290, which could, for example, be a Connection Machine from Thinking Machines Corporation. Parallel processor 290 includes processing units 294, each with local memory 292. Data defining an image can be stored in local memory 292 so that each pixel's value is stored in a respective processing unit's local memory. Each processing unit can store the respective value of one or more pixels in its local memory. Host processor 282 executes instructions from program memory 300 and accesses data memory 302 in performing image processing, as described above in relation to FIG. 15. Host processor 282 performs operations that include operating each pixel's respective processing unit in parallel to obtain distance data for use in obtaining distribution data indicating an attribute of character or stroke size or spacing.

Figure 17:
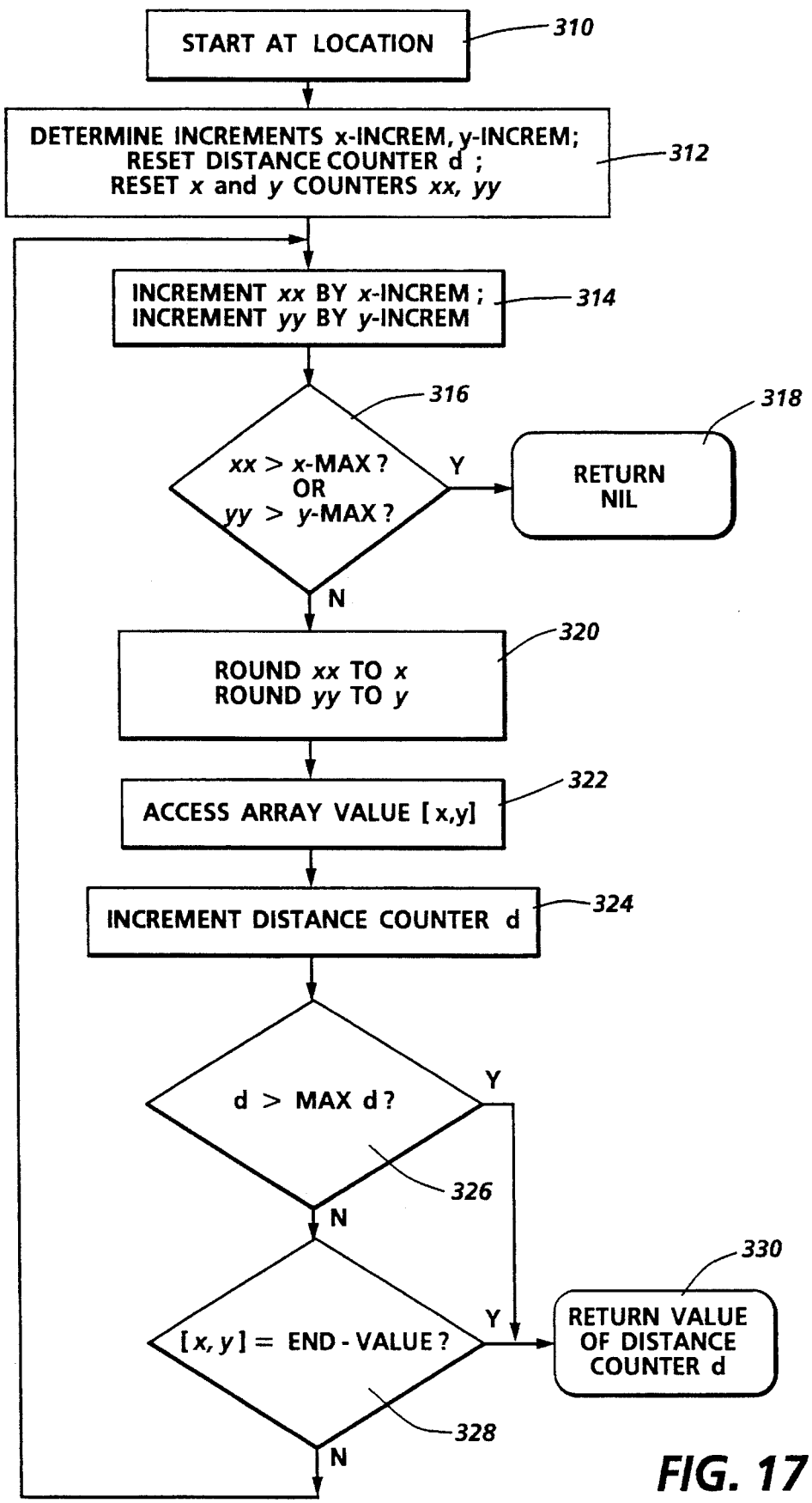
FIG. 17 is a flow chart showing steps in obtaining distance measurement data according to an implementation of the invention.
Figure 18:
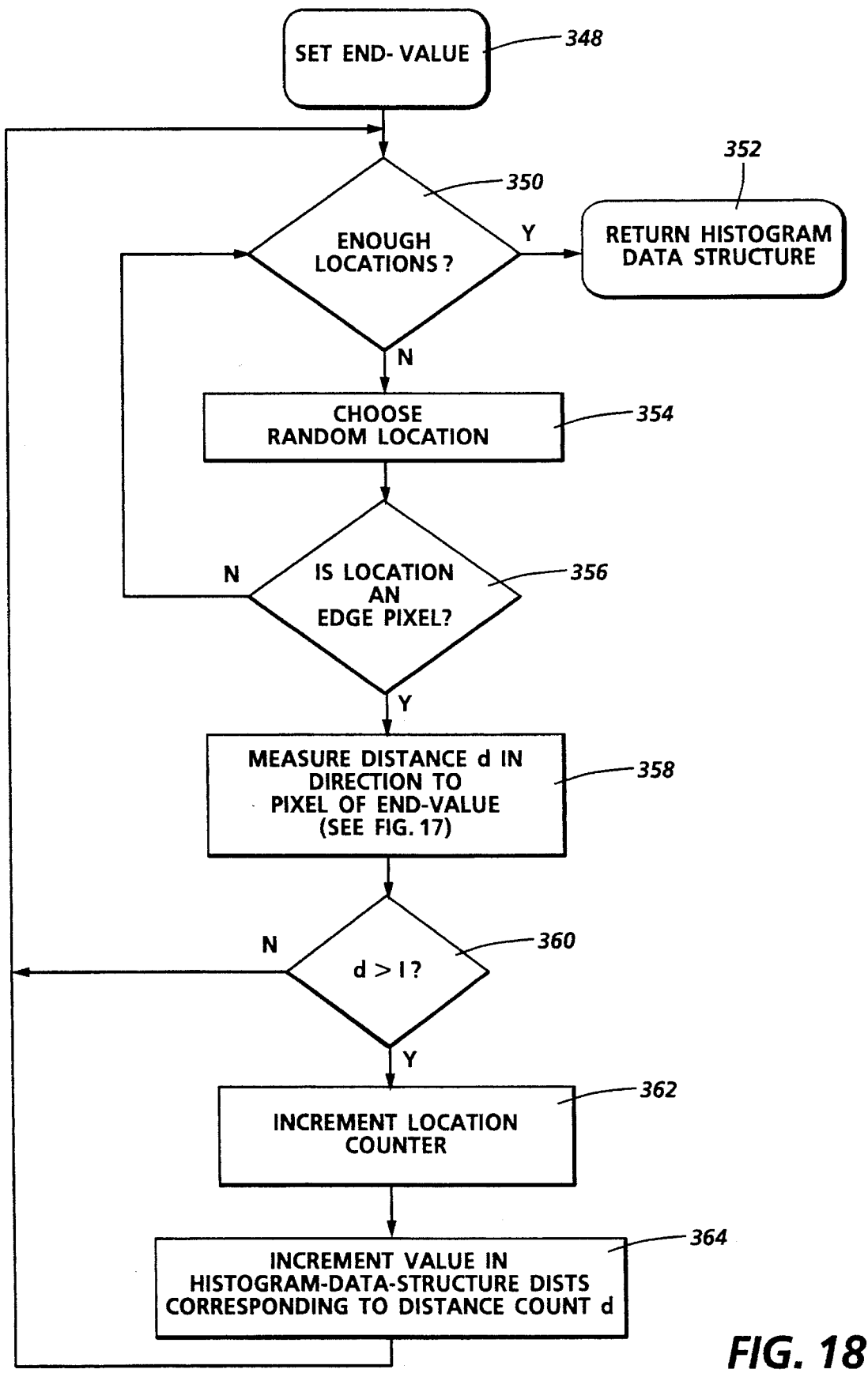
FIG. 18 is a flow chart showing steps in using distance measurement data produced as in FIG. 17 to obtain histogram data.
Figure 19:
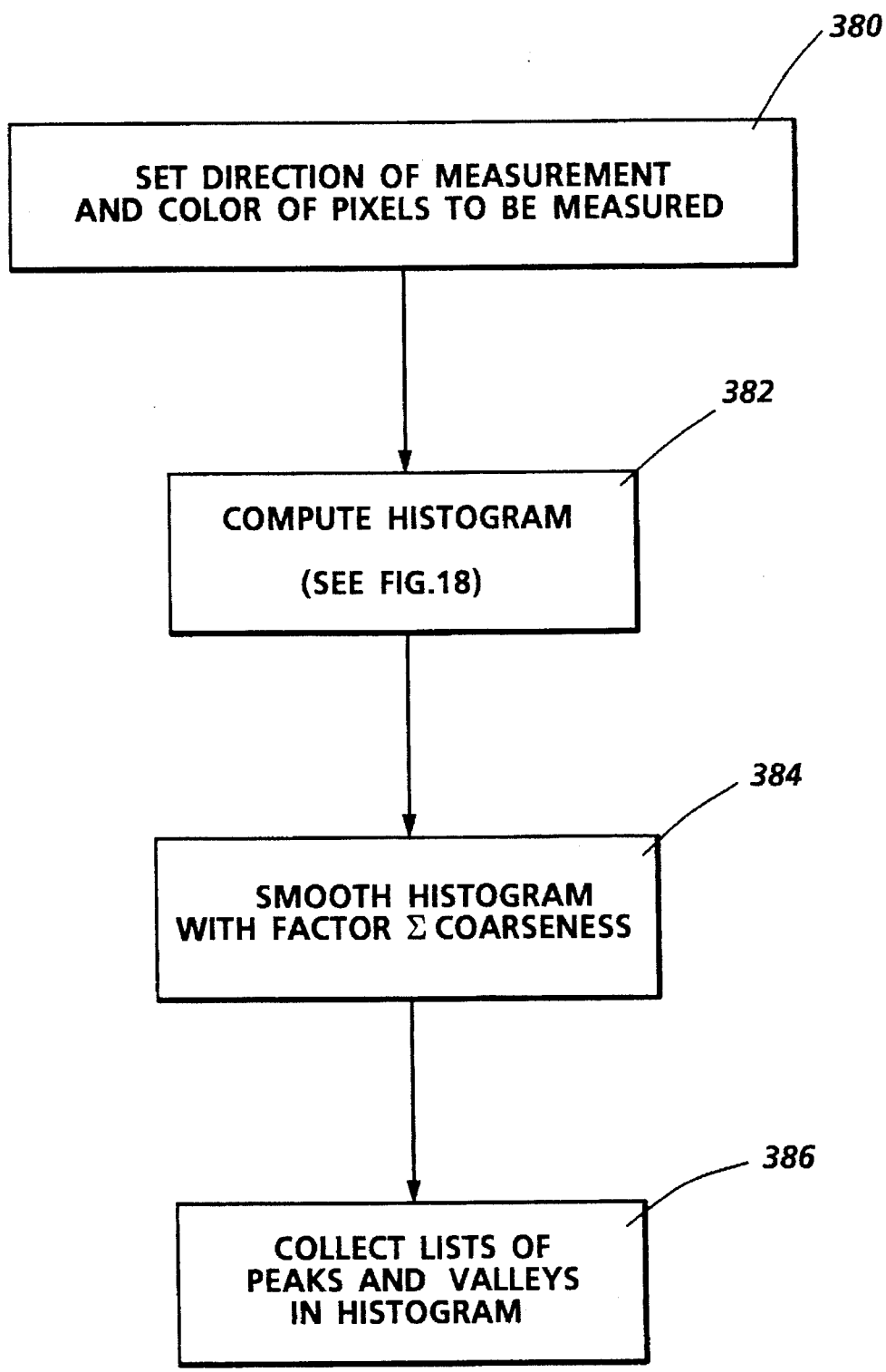
FIG. 19 is a flow chart showing steps in using histogram data produced as in FIG. 18 to obtain data indicating a particular character or stroke size or spacing attribute.

FIGS. 17–19 show an implementation of operations that could be performed by system 220 of FIG. 15. FIG. 17 shows an operation that produces a distance count in a direction within an image. FIG. 18 shows an operation that produces a histogram of distances that provides information about size or spacing of connected components in an image. FIG. 19 shows an operation that finds peaks and valleys in a histogram and chooses the peak corresponding to a desired attribute of character or stroke size or spacing.

FIG. 17 shows a method of measuring distance in a direction from a location in an image. The step in box 310 starts at a location. The step in box 312 determines increments in both the x and y directions based on the direction in which distance is being measured, and resets a distance count d and directional counts xx and yy.

The step in box 314 begins an iterative loop by incrementing the xx and yy counts by the respective increments. The step in box 316 checks that the new coordinates are not beyond limits xmax and ymax, the boundaries of the image. If they are, the step in box 318 returns nil, indicating the coordinates are beyond the boundary limits of the image.

If the coordinates xx and yy are not outside the boundaries of the image, the step in box 320 rounds the coordinates xx and yy to integer values x and y, respectively. The step in box 322 accesses an array of data items defining the image and uses the indices [x,y] to retrieve a data item defining a location in the image.

The step in box 324 increments the distance count d. The step in box 326 checks whether a distance limit has been reached. The method works well with a distance of 50 pixels for this limit. If the distance limit has not been reached, the step in box 328 checks whether the location defined by the retrieved data item meets a criterion for stopping. The criterion can be indicated by a variable end-value, indicating the color of a pixel at which an edge occurs for the measurement being made. If either the distance limit has been reached or the location has a value of end-value, the step in box 330 returns the value of the distance count d. Otherwise, the loop returns to box 314 for another iteration.

FIG. 18 shows an operation that uses the distance data obtained in FIG. 17 to obtain a histogram of distances measured in a direction within an image. The step in box 348 sets the value of end-value. This value determines whether the measurements will be made across black pixels or white pixels. If end-value is black, measurements will be made across white pixels until a black edge pixel is encountered. Conversely, if end-value is white, measurements will be made across black pixels until a white edge pixel is encountered.

The step in box 350 begins an iterative loop that handles each of a number of locations. Factors useful in determining appropriate locations and the number of locations are described in copending, coassigned U.S. patent application Ser. No. 07/737,956, entitled "Image Analysis Based on Location Sampling," incorporated herein by reference. The technique has been found to work well with 5000 locations. The step in box 354 chooses a random location. The step in box 356 checks to see that the chosen location is an edge pixel, and if not returns to box 354 to choose another location. The step in box 358 measures a distance d to a pixel matching end-value using the method shown in FIG. 17. Each distance measurement is made in the same direction. The step in box 360 checks whether the distance d is greater than 1. If it is not, the adjacent pixel to the current location has matched end-value, so that no distance can be measured. Therefore, the loop returns to box 350 to begin another iterative loop. If the value of d is greater than 1, the step in box 362 increments the location counter, and the step in box 364 accesses a histogram data structure and increments a frequency count for the range of distances that includes the distance d.

When the step in box 350 determines that sufficient locations have been measured, the step in box 352 returns the histogram data structure. This histogram data structure is distribution data that implicitly indicates character or stroke size or spacing attributes.

FIG. 19 shows an operation that uses the histogram obtained in FIG. 18 to obtain data explicitly indicating a particular character or stroke size or spacing attribute of text in an image. The step in box 380 sets constants which determine the direction and the color of pixels across which measurements are to be made. For example, if the desired attribute is interword spacing, measurements will be made parallel to lines of text, counting white pixels until a black edge pixel is reached. The step in box 382 computes a histogram as shown in FIG. 18 using the constants set in box 380.

The step in box 384 smooths the curve of the histogram from box 382 using conventional smoothing techniques. This step makes the peaks easier to pick out. It has been found that a smoothing factor of 2 or 3 is sufficient to produce good results in this step for histograms of white pixels. It has also been found that histograms of black pixels may not require smoothing in order to reliably pick out peaks and valleys. The step in box 386 collects lists of peaks and valleys in the histogram.

The lists from box 386 could be used to choose the peak or valley corresponding to the desired attribute. For example, if the desired attribute to be detected is interword spacing, the histogram will be made up of measurements of white pixels made parallel to the line of text. The first peak in the smoothed histogram indicates intercharacter spacing, and the second peak indicates interword spacing. This step may be done manually by looking at the lists or the histogram, or by a machine which automatically chooses the appropriate peak or valley from the list. If the peak is automatically chosen, the machine could return the distance at which the peak occurs.

D. Applications

Figure 20:
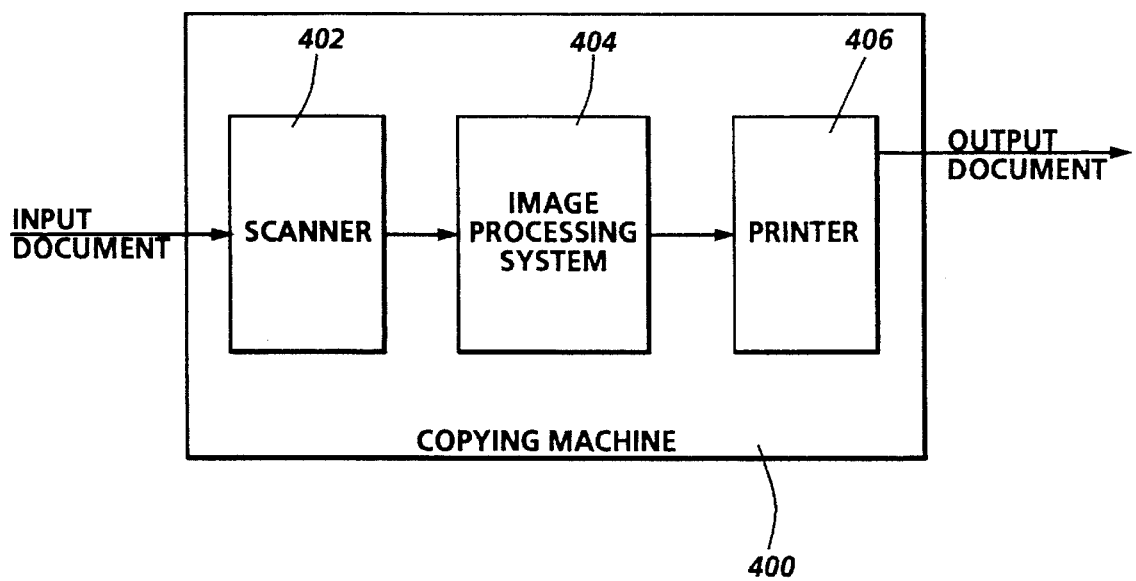
FIG. 20 is a schematic block diagram illustrating an application of the invention in a copying machine.

The invention could be applied in many ways. In general, data indicating character or stroke size or spacing attributes can be used in any image processing application that employs segmentation. FIG. 20 illustrates an application of the invention in a copying machine.

In FIG. 20, copying machine 400 includes scanner 402, image processing system 404, and printer 406. Scanner 402 can produce data defining an image of an input document. Image processing system 404 can be implemented as shown in FIG. 15 or FIG. 16, and can, in addition to measuring character and stroke sizes and spacings, use optical character recognition techniques to identify characters in the document. The character and stroke sizes and spacings can be used for page segmentation to improve character recognition. Image processing system 404 might also apply techniques to produce data defining a modified image. For example, if a character or groups of characters is highlighted or otherwise shown in a way that indicates selection, character spacings could be used to determine the outer boundary of the highlighting or the like. Character sizes and spacings could also be used to help identify connected components that are not part of the printed text, so that they can be removed from the image. The data defining the modified image could then be provided to printer 406 to print an output document.

E. Source Code Appendix

Appendix A is Common Lisp source code implementing some of the features described above. The code in Appendix A, when executed on a Sun-4 workstation, generally follows the implementation described in relation to FIGS. 17–19 above. Nonetheless, the code may differ from the above description in various ways. For example, the code may be divided into procedures or routines differently than described above.

Appendix A includes the following:

The function distance-to-value computes a distance from a starting location to a pixel at which an edge occurs for the measurement being made.

The function histogram-local-edge-distances-at-orientation obtains a histogram from edge locations, using the function distance-to-value.

The function edge-pixel determines whether a pixel in an image is a black edge pixel.

The function plot-distance-histogram graphically plots the histogram obtained by histogram-local-edge-distances-at-orientation.

The function run-dists obtains histograms of both black and white pixels in parallel and perpendicular directions using histogram-local-edge-distances-at-orientation, and plots the resulting histograms with plot-distance-histogram.

The function run-whitespace estimates the peaks and valleys of white pixels in the parallel direction.

The function white-run-peaks-and-valleys picks the peaks and valleys of a one-dimensional function after first smoothing it with a gaussian using convolution using 1d-gaussian and 1d-convolution.

The function peaks-and-valleys makes a list of peaks and valleys in an array. The function is generally smoothed by a gaussian function before being stored in the array.

The function between determines whether a value is between two bounding values.

The function 1d-gaussian and 1d-convolution are used in smoothing a one-dimensional function for use by white-run-peaks-and-valleys.

The definition samples provides a list of samples of text for experimental use.

F. Miscellaneous

The invention has been described in relation to implementations in which operations are performed on data defining an image to obtain data indicating information about character and stroke sizes and spacings in text in the image. The invention might also be implemented with specialized circuitry connected to photosensors for directly obtaining data indicating information about character and stroke sizes and spacings in text in an image.

The invention has also been described in relation to implementations in which distances are measured from randomly selected locations. The starting locations for distance measurement could alternatively be selected with some other criterion, such as all pixels at edges, or every Nth edge pixel.

The invention has been described in relation to implementations in which distribution data is obtained by obtaining histograms. Other techniques might be used to obtain distribution data, including other techniques that indicate frequency as a function of distance or that indicate the maxima or central value of frequency as a function of distance. In general, distribution data can be obtained after all distance measurements are obtained or, to reduce data storage requirements, distance measurements can be combined as they are obtained.

The invention has been described in relation to software implementations, but the invention might be implemented with specialized hardware.

Although the invention has been described in relation to various implementations, together with modifications, variations, and extensions thereof, other implementations, modifications, variations, and extensions are within the scope of the invention. The invention is therefore not limited by the description contained herein or by the drawings, but only by the claims.

APPENDIX A

© Copyright 1990  Xerox Corporation   All Rights Reserved

;;; -*- Mode: LISP; Syntax: Common-Lisp -*-

```
(defconstant black-value 1)
(defconstant white-value 0)

(defun between (val lo hi)
 (and (>= val lo)
    (<= val hi)))

(defun angle->unit-vector (angle)
 (list (cos angle) (sin angle)))

(defun angle->unit-vector-table (num-orients)
 (loop with tab = (make-array (list num-orients 2))
            with incr = (/ (* 2 pi) num-orients)
            for i from 0 below num-orients
            for a = (* i incr)
            do (setf (aref tab i 0) (cos a))
              (setf (aref tab i 1) (sin a))
            finally (return tab)))

;; compute distance from a location x,y to the first occurence of value, in
;; the direction dx,dy (defun distance-to-value (bitmap value x y dx dy maxd xmax ymax)
   (loop    for xx from (+ x dx) by dx
            for yy from (+ y dy) by dy
            for v = (and (between xx 0 xmax)
                          (between yy 0 ymax)
                          (raster-aref bitmap (round xx) (round yy)))
            for d from 1
            when (not v)
             do (return nil)
            when (or (= d maxd)
                     (= v value))
             do (return d)))

;; histogram distances at some number of orientations
```

```
(defun histogram-local-distances
     (bitmap num-points num-orients start-value end-value maxd ignore1? xmax ymax)
  (let ((orients (angle->unit-vector-table num-orients))
         (dist-sum (make-array num-orients :initial-element 0))
         (num (make-array num-orients :initial-element 0))
         (n 0))
   (do () ((= n num-points))
    (let ((x (random xmax))
            (y (random ymax)))
         (when (= (raster-aref bitmap x y) start-value)
          (incf n)
          (dotimes (orient num-orients)
           (let ((d (distance-to-value
                        bitmap end-value x y (aref orients orient 0) (aref orients orient 1)
                        maxd xmax ymax)))
                (when (and d (or (not ignore1?) (> d 1)))
                     (incf (aref dist-sum orient) d)
                     (incf (aref num orient))))))))
   (dotimes (orient num-orients)
    (if (not (zerop (aref num orient)))
          (setf (aref dist-sum orient)
                (/ (aref dist-sum orient)
                    (aref num orient)))))
   dist-sum))

;;;; Note: significant speedup to be obtained by sampling each
;;;; neighborhood point only once, rather than many times as now.

(defun plot-orientation-histogram (hist)
 (loop with num-orients = (array-dimension hist 0)
          with incr = (/ (* 2 pi) num-orients)
          for i below num-orients
          collect (aref hist i) into vals
          collect (* i incr) into orients
          finally (plot:plot orients vals)))

;; histogram distances at a given fixed orientation (defun histogram-local-distances-at-orientation
     (bitmap num-points orient start-value end-value maxd ignore1? xmax ymax)
  (let ((dists (make-array (1+ maxd) :initial-element 0))
         (n 0)
         (dx (cos orient))
```

```
                (dy (sin orient)))
    (do () ((= n num-points))
     (let ((x (random xmax))
           (y (random ymax)))
          (when (= (raster-aref bitmap x y) start-value)
           (incf n)
           (let ((d (distance-to-value
                     bitmap end-value x y dx dy
                     maxd xmax ymax)))
                (when (and d (or (not ignore1?) (> d 1)))
                 (incf (aref dists d))))))))
   dists))

(defun histogram-local-edge-distances-at-orientation
       (bitmap num-points orient end-value maxd ignore1? xmax ymax)
  (let ((dists (make-array (1+ maxd) :initial-element 0))
        (n 0)
        (dx (cos orient))
        (dy (sin orient)))
    (do () ((= n num-points))
     (let ((x (random xmax))
           (y (random ymax)))
          (when (edge-pixel bitmap x y xmax ymax)
           (incf n)
           (let ((d (distance-to-value
                     bitmap end-value x y dx dy
                     maxd xmax ymax)))
                (when (and d (or (not ignore1?) (> d 1)))
                 (incf (aref dists d))))))))
   dists))

(defun edge-pixel (bitmap x y xmax ymax)
  (and (= (raster-aref bitmap x y) black-value)
   (loop for xx from (max 0 (1- x)) to (min xmax (1+ x))
         if (loop for yy from (max 0 (1- y)) to (min ymax (1+ y))
                  if (= (raster-aref bitmap xx yy) white-value)
                      do (return t))
             do (return t))))

(defun plot-distance-histogram (hist)
  (loop with num-distances = (array-dimension hist 0)
        for i below num-distances
        collect (aref hist i) into vals
```

```
                    collect i into dists
                    finally (plot:plot dists vals)))

(defun array-difference (arr1 arr2)
 (loop with r = (make-array (array-dimensions arr1))
             for i below (array-dimension arr1 0)
             do (setf (aref r i) (- (aref arr1 i) (aref arr2 i)))
             finally (return r)))

(defvar samples
            '(
;           helvetica-30
;           helvetica-45
;           helvetica-60
;           times-30
;           times-40
;           times-50
;           palatino-30
;           palatino-45
;           palatino-60
            helvetica-12-1
            helvetica-12-2
            helvetica-12-3
            helvetica-24-1
            helvetica-24-2
            helvetica-24-3
            bodini-12-1
            bodini-12-2
            bodini-12-3
            times-12-1
            times-12-2
            times-12-3
            times-24-1
            times-24-2
            times-24-3
            university-roman
            times1
            times-cap
            times-double
            tex
            tex-skew
            revue
            palatino
```

```
                p-bodini-poster
                new-york
                helvetica
                freestyle-script
                garamond
                cl-helvetica
                bookman
                bodini
                avant-guard))
```

;; top-level function to plot out black and white-run histograms
;; at text orientation (across) and perpendicular (down)

```
(defun run-dists (samples &optional (npts 5000))
  (loop for sample in samples
            for sample-val = (eval sample)
            do (format t "~&Sample ~a, black run across" sample)
              (plot-distance-histogram
                (histogram-local-edge-distances-at-orientation
                  sample-val npts 0 0 50 t 511 511))
              (format t "~&Sample ~a, black run down" sample)
              (plot-distance-histogram
                (histogram-local-edge-distances-at-orientation
                  sample-val npts (/ pi 2) 0 50 t 511 511))
              (format t "~&Sample ~a, white run across" sample)
              (plot-distance-histogram
                (histogram-local-edge-distances-at-orientation
                  sample-val npts 0 1 50 t 511 511))
              (format t "~&Sample ~a, white run down" sample)
              (plot-distance-histogram
                (histogram-local-edge-distances-at-orientation
                  sample-val npts (/ pi 2) 1 50 t 511 511))))

(defun white-run-across (sample npts)
  (histogram-local-edge-distances-at-orientation
    sample npts 0 1 50 t 511 511))
```

;; estimate whitespace by looking at peaks and valleys of white pixels in
;; horizontal direction

```
(defun run-whitespace (samples &optional (npts 5000))
  (loop for sample in samples
```

```
              for sample-val = (eval sample)
              do (format t "~&Sample ~a: ~a ~& ~a"
                         sample (white-run-peaks-and-valleys sample-val npts 2)
                         (white-run-peaks-and-valleys sample-val npts 3))))
```

;; this picks peaks and valleys of a 1d function by first smoothing it with
;; a gaussian (using convolution), and then picking peaks.

```
(defun white-run-peaks-and-valleys (sample npts sigma)
 (let ((hist (histogram-local-edge-distances-at-orientation
                   sample npts 0 1 50 t 511 511)))
   (peaks-and-valleys (1d-convolution hist (make-1d-gaussian sigma)))))
```

;; make a list of peak and valley sample locations from a functions
;; (generally smoothed first by a gaussian)

```
(defun peaks-and-valleys (arr)
 (loop with prev = (aref arr 0)
       for i from 1 below (1- (array-dimension arr 0))
       for val = (aref arr i)
       for next = (aref arr (1+ i))
       if (and (> val prev) (> val next))
         collect (list :peak i)
       else if (and (< val prev) (< val next))
           collect (list :valley i)
       do (setf prev val)))
```

;;;;; auxiliary glop

```
(defun read-mouse-click (&optional (window tv:selected-window))
 (loop for blip = (scl:send window :any-tyi)
       for button = (and (listp blip) (or (eq (car blip) :mouse-click)
                                           (eq (car blip) :mouse-button)))
       when button
         do (return (list (second blip) (fourth blip) (fifth blip))))))

(defun square (x)
 (* x x))

(defun measure-distance (&optional (window display-window))
 (destructuring-bind (ignore x1 y1)
```

```
    (read-mouse-click window)
    (destructuring-bind (ignore x2 y2)
                (read-mouse-click window)
      (sqrt (+ (square (- x1 x2)) (square (- y1 y2)))))))

;;;;

(defun test-run ()
  (loader)
  (loader2)
  (loader3)
  (run-dists samples))

(defun make-1d-gaussian (sigma)
  (let* ((width (round (1+ (* 8. sigma))))
         (operator (make-array width)))
    (do* ((i 0 (1+ i))
          (j (- (truncate (/ (1- width ) 2.))) (1+ j))
          (expl (exp (/ (- (* j j)) (* 2.0 (* sigma sigma))))
                (exp (/ (- (* j j)) (* 2.0 (* sigma sigma))))))
         ((= i width))
      (setf (aref operator i) expl))
    (let ((area (sum-elements operator)))
      (do ((i 0 (1+ i)))
          ((= i width) (return operator))
        (setf (aref operator i) (/ (aref operator i) area))))))

(defun sum-elements
    (vector &optional (start 0) (stop (car (array-dimensions vector))))
  (loop for index from start below stop
        sum (aref vector index)))

(defun 1d-convolution (input-vector kernal-vector &optional start length)
  (let* ((length (or length (car (array-dimensions input-vector))))
         (start (or start 0))
         (output-vector (make-array length))
         (end (+ length start))
         (last (1- end))
         (kernal-width (car (array-dimensions kernal-vector))))
    (do ((output-elt start (1+ output-elt)))
        ((= output-elt end) (return output-vector))
      (setf (aref output-vector output-elt)
            (1d-convolution-summer
``` input-vector kernal-vector kernal-width output-elt start last)))))

```
(defun 1d-convolution-summer
          (input-vector kernal-vector kernal-width output-elt start last)
  (let ((sum 0))
    (do ((input-elt (- output-elt (truncate (/ kernal-width 2))) (1+ input-elt))
         (index 0 (1+ index)))
        ((= index kernal-width) (return sum))
      (incf sum (* (aref input-vector (clip input-elt start last))
                   (aref kernal-vector index))))))
```

What is claimed:

1. A method of performing image processing on an N-dimensional image that includes text, where N is two or more; the image including two or more connected components that form the text; the connected components together having a prominent size or spacing in a measuring direction in the image; the image being accessible as an array of locations each with N coordinates, the array including a data item at each location; for each line that extends in the measuring direction, two of the N coordinates varying along the line so that the line is not parallel to either of the two coordinates axes; the method comprising steps of:

measuring two or more distances between edges of the connected components along lines extending in the measuring direction to obtain, for each of the distances, respective measurement data indicating the distance; each distance being measured by:

obtaining N starting coordinates of a starting location at an edge of a connected component;

obtaining N incremental values, with one of the N incremental values for each of the N coordinates; the N incremental values together defining an incremental line that extends in the measuring direction;

performing a series of iterations that includes a first iteration and a last iteration, each iteration having N initial coordinates of an initial location and N final coordinates of a final location; the N initial coordinates of the first iteration being the N starting coordinates; each iteration comprising:

using the iteration's N initial coordinates and the N incremental values to obtain the iteration's N final coordinates, the iteration's final location being displaced incrementally from the iteration's initial location along a line that extends in the measuring direction which is not parallel to either of the coordinate axes;

using the iteration's N final coordinates to access a data item at a location in the array;

determining whether the accessed data item is at a location at another edge of a connected component; and if the accessed data item is at a location at another edge of a connected component, obtaining measurement data indicating a distance between the starting location and the iteration's final location, the iteration that obtains measurement data being the last iteration in the series;

using the measurement data to obtain distribution data, the distribution data indicating a distribution of the distances between edges of the connected components in the measuring direction; the distances being measured between edges of a sufficient number of the connected components that the distribution data further indicate a measure of the prominent size or spacing of the connected components in the measuring direction for the image.

2. An image processing machine comprising:

memory for storing data; and a processor connected for accessing the memory;

the data stored by the memory including:

image data defining an N-dimensional image that includes text, where N is two or more; the image including two or more connected components that form the text; the connected components together having a prominent size or spacing in a measuring direction in the image; the image data being accessible as an array of locations each with N coordinates, the array including a data item at each location; for each line that extends in the measuring direction, at least two of the N coordinates varying along the line so that the line is not parallel to either of the two coordinate axes; and instruction data indicating instructions the processor can execute to perform image processing;

the processor, in executing the instructions:

measuring two or more distances between edges of the connected components along lines extending in the measuring direction within the image to obtain, for each of the distances, respective measurement data indicating the distance; each distance being measured by:

obtaining N starting coordinates of a starting location at an edge of a connected component;

obtaining N incremental values, with one of the N incremental values for each of the N coordinates; the N incremental values together defining an incremental line that extends in the measuring direction which is not parallel to either of the two coordinate axes;

performing a series of iterations that includes a first iteration and a last iteration, each iteration having N initial coordinates of an initial location and N final coordinates of a final location; the N initial coordinates of the first iteration being the N starting coordinates; each iteration comprising:

using the iteration's N initial coordinates and the N incremental values to obtain the iteration's N final coordinates, the iteration's final location being displaced incrementally from the iteration's initial location along a line that extends in the measuring direction;

using the iteration's N final coordinates to access a data item at a location in the array;

determining whether the accessed data item is at a location at another edge of a connected component; and if the accessed data item is at a location at another edge of a connected component, obtaining measurement data indicating a distance between the starting location and the iteration's final location, the iteration that obtains measurement data being the last iteration in the series;

using the measurement data to obtain distribution data indicating a distribution of the distances between edges of the connected components in the measuring direction, the distances being measured between edges of a sufficient number of the connected components that the distribution data further indicate a measure of the prominent size or spacing of the connected components in the measuring direction for the image.

3. The method of claim 1 in which each connected component includes locations at which the image has a first color, each location's distance data indicating distance across locations of the first color.

4. The method of claim 1 in which each connected component includes locations at which the image has a first color, each location's distance data indicating distance between locations of the first color.

5. The method of claim 1 in which each of the two or more locations is a pixel.

6. The method of claim 1 in which the distribution data indicate distribution of measurements as a function of distance for the image.

7. The method of claim 6 in which the distribution data form a histogram.

8. The method of claim 1 in which the image includes lines of text, the measuring direction being approximately parallel to the lines of text.

9. The method of claim 8 in which the text includes characters, the method further comprising a step of operating on the distribution data to obtain intercharacter spacing data indicating spacing between characters in the text.

10. The method of claim 8 in which the text includes words, the method further comprising a step of operating on the distribution data to obtain interword spacing data indicating spacing between words within the text.

11. The method of claim 8 in which the text includes strokes extending in a perpendicular direction approximately perpendicular to the lines of text, the method further comprising a step of operating on the distribution data to obtain stroke width data indicating width of strokes extending in the perpendicular direction.

12. The method of claim 8 in which the text includes characters, the method further comprising a step of operating on the distribution data to obtain maximum character width data indicating a maximum width of characters in the text in the measuring direction.

13. The method of claim 8 in which the lines of text are at a skew; the method further comprising a step of obtaining skew data indicating the skew; the measuring direction being the direction indicated by the skew data.

14. The method of claim 1 in which the image includes lines of text, the measuring direction being approximately perpendicular to the lines of text.

15. The method of claim 14, further comprising a step of operating on the distribution data to obtain interline spacing data indicating spacing between lines in the text.

16. The method of claim 14 in which the text includes strokes extending in a parallel direction approximately parallel to the lines of text, the method further comprising a step of operating on the distribution data to obtain stroke width data indicating width of strokes extending in the parallel direction.

17. The method of claim 14 in which the text includes characters, the method further comprising a step of operating on the distribution data to obtain maximum character height data indicating a maximum height of characters in the text in the measuring direction.

18. The method of claim 14 in which the lines of text are at a skew; the method further comprising a step of obtaining skew data indicating the skew; the measuring direction being perpendicular to the direction indicated by the skew data.

19. The machine of claim 2, further comprising:

an image input device for receiving an input image and for providing input image data defining the input image; and an image output device for receiving output image data defining an output image and for providing the output image;

the processor further, in executing the instructions:
storing the input image data from the image input device in the memory;
modifying the image data stored in memory in accordance with the measure of size or spacing indicated by the distribution data to obtain modified image data; and
providing output image data to the image output device based on the modified image data.

20. The machine of claim 2 in which the distribution data indicate distribution of measurements as a function of distance.

21. The machine of claim 20 in which the distribution data form a histogram.

22. The machine of claim 2 in which the lines of text are at a skew; the processor further, in executing the instructions:

obtaining skew data indicating the skew; and determining the measuring direction based on the skew indicated by the skew data.

* * * * *